United States Patent
Kennon et al.

(10) Patent No.: US 10,134,095 B2
(45) Date of Patent: Nov. 20, 2018

(54) SYSTEM AND METHOD FOR MEDIA-CENTRIC AND MONETIZABLE SOCIAL NETWORKING

(71) Applicants: Thomas Kennon, New York, NY (US); Jeffrey DePalma, Hasbrouck Heights, NJ (US)

(72) Inventors: Thomas Kennon, New York, NY (US); Jeffrey DePalma, Hasbrouck Heights, NJ (US)

(73) Assignee: Brabble TV.Com LLC, New York, NY (US)

( * ) Notice: Subject to any disclaimer, the term of this patent is extended or adjusted under 35 U.S.C. 154(b) by 0 days.

(21) Appl. No.: 14/043,601

(22) Filed: Oct. 1, 2013

(65) Prior Publication Data
US 2014/0365581 A1    Dec. 11, 2014

Related U.S. Application Data

(60) Provisional application No. 61/831,326, filed on Jun. 5, 2013.

(51) Int. Cl.
*G06Q 50/00* (2012.01)
*H04L 29/06* (2006.01)
(Continued)

(52) U.S. Cl.
CPC ......... *G06Q 50/01* (2013.01); *G06F 21/6218* (2013.01); *G06Q 30/0269* (2013.01);
(Continued)

(58) Field of Classification Search
CPC .. H04N 21/4788; G06Q 50/01; H04L 65/403; H04L 63/102; H04L 67/10; H04L 67/306; G06C 50/01; G06F 17/30696
(Continued)

(56) References Cited

U.S. PATENT DOCUMENTS 7,685,536 B2 *   3/2010   Hebert et al. ................ 715/854
7,756,926 B2     7/2010   Tseng et al.
(Continued)

OTHER PUBLICATIONS

Summer Marion, YouTube Homepage Showcases Project, Dec. 28, 2010, Pulitzer Center, http://pulitzercenter.org/blog/youtube-homepage-showcases-project-report-winners.*
(Continued)

*Primary Examiner* — David Lazaro
*Assistant Examiner* — Zi Ye
(74) *Attorney, Agent, or Firm* — Hunton Andrews Kurth LLP

(57) ABSTRACT

A method and system connects brands, users and communities via socially shared content elements that take the form of, for example, words, pictures/images, videos and/or audio objects. The method creates a social media engagement and distribution capability of dynamic, interactive impressions linking users to users and users to brands around shared "day in the life" moments. The spectrum of reach and range of content types combined with user daily lives creates a ubiquitous new web medium of social content. The user experience created by this method and system creates a sustainable stickiness for members, capturing, creating, sharing and responding to each other interactively in any communication format, at any time, in any place and for any reason.

23 Claims, 7 Drawing Sheets

(51) Int. Cl.
*H04L 29/08* (2006.01)
*G06F 21/62* (2013.01)
*G06Q 30/02* (2012.01)

(52) U.S. Cl.
CPC ....... *G06Q 30/0277* (2013.01); *H04L 63/102* (2013.01); *H04L 65/403* (2013.01); *H04L 65/601* (2013.01); *H04L 67/10* (2013.01); *H04L 67/306* (2013.01); *G06F 2221/2145* (2013.01)

(58) Field of Classification Search
USPC ............ 709/228, 205, 204; 725/24; 707/738
See application file for complete search history.

(56) References Cited

U.S. PATENT DOCUMENTS

| | | | |
|---|---|---|---|
| 8,010,691 | B2 | 8/2011 | Kollmansberger et al. |
| 8,756,500 | B2* | 6/2014 | Harris et al. ................. 715/273 |
| 8,798,598 | B2 | 8/2014 | Rossmann |
| 8,819,719 | B1* | 8/2014 | Chen et al. ...................... 725/24 |
| 8,856,232 | B1 | 10/2014 | Swerdlow et al. |
| 8,874,089 | B1* | 10/2014 | Daniel ....................... 455/414.1 |
| 2005/0076058 | A1 | 4/2005 | Schwesig et al. |
| 2008/0222513 | A1* | 9/2008 | Van Den Berge ........................... H04N 1/00209 715/234 |
| 2009/0150406 | A1* | 6/2009 | Giblin ............... G06F 17/30817 |
| 2009/0327739 | A1 | 12/2009 | Relyea et al. |
| 2010/0228691 | A1* | 9/2010 | Yang .................. G06F 17/3089 706/12 |
| 2010/0303146 | A1 | 12/2010 | Kamay |
| 2011/0106835 | A1* | 5/2011 | Lauridsen ........... G06F 17/3089 707/769 |
| 2011/0218997 | A1 | 9/2011 | Boiman et al. |
| 2012/0209850 | A1* | 8/2012 | Kikin-Gil ......... G06F 17/30696 707/738 |
| 2012/0266083 | A1 | 10/2012 | Ishihara et al. |
| 2012/0331568 | A1 | 12/2012 | Weinstein et al. |
| 2013/0013700 | A1 | 1/2013 | Sittig et al. |
| 2013/0083906 | A1 | 4/2013 | Roberts et al. |
| 2013/0086185 | A1 | 4/2013 | Desmarais et al. |
| 2013/0093833 | A1 | 4/2013 | Al-Asaaed et al. |
| 2013/0117353 | A1* | 5/2013 | Wong ................ G06F 17/30867 709/203 |
| 2013/0297691 | A1* | 11/2013 | Collins .................. G06Q 50/01 709/204 |
| 2014/0032718 | A1 | 1/2014 | Berger et al. |
| 2014/0208216 | A1* | 7/2014 | Koo ...................... H04W 4/206 715/736 |
| 2015/0074825 | A1 | 3/2015 | Blake et al. |

OTHER PUBLICATIONS iKeepSafe, What do I do if my child has an inappropriate video on YouTube, Oct. 22, 2012, www.ikeepsafe.org, http://web.archive.org/web/20121022164540/http://www.ikeepsafe.org/be-a-pro/reputation/what-do-i-do-if-my-child-has-an-inappropriate-video-on-youtube/.*
International Search Report dated Jan. 22, 2015 from PCT/US14/41139 filed Jun. 5, 2014.
Extended European Serach Report dated Jan. 25, 2017, in European Patent Application No. 14 807 263.0 (13 pages).
Examination Report No. 1 for Australian Patent Application No. 2014274810 dated Aug. 3, 2017.

* cited by examiner

SYSTEM AND METHOD FOR MEDIA-CENTRIC AND MONETIZABLE SOCIAL NETWORKING

CROSS-REFERENCE TO RELATED APPLICATION

This application claims the benefit, under 35 U.S.C. § 119(e), of U.S. Prov. Pat. App. Ser. No. 61/831,326, filed Jun. 5, 2013, the entire contents of which is hereby incorporated by reference.

FIELD OF THE INVENTION

The present invention relates to computer-implemented methods and systems for connecting users, brands, and communities for social interaction and monetization, such connection being through content, social interaction, and access methods integrated into an expert platform.

BACKGROUND

Companies, such as those of the music or sports industry, have become challenged in how to monetize their products and brands in the face of disruption to distribution, e-commerce, retail and user consumption models. For example, the music industry is disrupted by combined aggregators, distributors and consumption points, e.g., iTunes, Spotify, Pandora, etc. Fans enjoy more choice, access, and cost control than ever. Increasingly, fans leverage other fans within socially connected crowd-sourced environments to discover, consume, and share music content. Labels' and artists' attempts to connect with fans via existing social media remain one way and non-interactive. The critical role of live performances, tours, and personal events is under-leveraged by artists and labels in driving the required incremental revenue to offset the loss of margin ceded to the digital product aggregators/distributors.

Additionally, a great diversity of interests separate the disparate mix of stakeholders within top levels of professional sports, where, arguably, the core product all sports stakeholder share are the players. These interests are not fully satisfied with conventional systems and schemes for monetizing distributed digital content, products, and branded experiences.

Moreover, brands, especially consumer products brands, show increasingly diminished returns on their digital advertising investments due to low quality inventory and lack of penetration into emerging social networks. Consumer product brands seek more efficient and scalable means for their advertising investment when consumers are increasingly non-receptive or blind to traditional and current digital advertising media.

SUMMARY

Most sharing and distribution decisions for current social media and personal content are limited in range, type, and specificity. When capturing and creating personal social media content, most social applications and networks offer a limited range of publishing and distribution options to the user, especially at the discrete individual content sharing level. Example embodiments of the present invention provide an improved social networking system that increases user interaction with each other and with content elements and increases monetization of content elements, e.g., for brands, publishers, and product owners.

GUI Including Components for Selecting from a Plurality of Content Types to Record According to an example embodiment of the present invention, a computer-implemented method includes: outputting, by a computer processor of a device, a first graphical user interface (GUI) display arrangement that includes a control, in response to user selection of which the device is configured to activate a media capture component for recording and storing a media content object, where a type of the media content object recordable by user interaction with the first GUI display arrangement is selectable, by the user and within the first GUI display arrangement, from a plurality of media content object types.

In an example, the plurality of media content object types include video, audio, image, and text. Still further, in an example, a combination of the media content object types is selectable for creating a media content object structure that includes a respective content object of each of the selected types of the combination, the respective content objects of the structure being associated with each other by the structure. Still further, in an example embodiment, the structure is selectable for playback, during which playback all of the media content objects of the structure are output.

In an example, the method further includes, responsive to the recording of the media content object using the media capture component, in the state of activation responsive to the user selection of the control, outputting, by the processor, a second GUI display arrangement including a posting control that is user controllable for posting the recorded media content object to a platform on a network that is accessible for consumption of the recorded media content object by other users.

According to an example embodiment of the present invention, a non-transitory computer-readable medium includes, stored thereon, instructions that are executable by a processor of a device, the instructions which, when executed by the processor, cause the processor to perform a method, the method including: outputting a first graphical user interface (GUI) display arrangement that includes a control, in response to user selection of which the device is configured to activate a media capture component for recording and storing a media content object, where a type of the media content object recordable by user interaction with the first GUI display arrangement is selectable, by the user and within the first GUI display arrangement, from a plurality of media content object types.

According to an example embodiment of the present invention, a computer system includes a device including a computer processor, the processor configured to: output a first graphical user interface (GUI) display arrangement that includes a control, in response to user selection of which the device is configured to activate a media capture component for recording and storing a media content object, where a type of the media content object recordable by user interaction with the first GUI display arrangement is selectable, by the user and within the first GUI display arrangement, from a plurality of media content object types.

Reply Post Creation

According to an example embodiment of the present invention, a computer-implemented method includes: obtaining, by a computer processor and via a network, a first media content object attributed to a first user; outputting, by the processor and via a graphical user interface display arrangement for a second user, the obtained first media content object; receiving, by the processor, user input by interaction with the graphical user interface arrangement; and based on the user input, recording and transmitting over the network, a second media content object in association with the first media content object, where the second media content object includes at least one of video, audio, and an image.

In an example, the obtained first media content object is displayed, in the outputting step, in a post object that includes a graphical control that is user-selectable for activating a video recorder to record a video limited to no longer than a predefined length; and the method further includes, responsive to finalization of the recording of the video, inserting the video as a reply to the first media content object, such that, in response to subsequent access of the of first media content object via the network, the first media content object is posted together with the video as a sub-entry thereto. Still further, in an example embodiment, the predefined length is 45 seconds.

For example, with respect to the 45 second threshold, which is much longer than conventional video clips that can be inserted into posts, according to an example embodiment of the present invention, a unique compression algorithm is used which achieves maximum real-time optimization of a range of disparate and variable factors and conditions simultaneously to deliver a previously unattainably high level of user experience in compression speed, efficiency, and finished output during video file capturing and processing. Further, according to an example embodiment, a unique caching algorithm is implemented which achieves maximum real-time optimization of a range of disparate and variable factors and conditions simultaneously including file size, network speed/latency, server availability, and audio-to-video quality balance to deliver a previously unattainably high level of reduced latency and completion rate during video file upload, including compiling multiple versions after an original file is uploaded, including multiple compiled versions of 336, 512, 1200 and 2000 bitrate KBPS. For example, according to an example embodiment, a unique download and playback experience is provided, which achieves maximum real-time optimization of a range of disparate and variable factors and conditions simultaneously, including file size, network speed/latency, and server availability to deliver a previously unattainably high level of reduced latency and playback quality by storing multiple versions of the same video for optimal playback, the original version plus four original version of varying quality and size.

In this regard, according to an example embodiment of the present invention, a responsive compression algorithm dynamically assesses the quality of the user's network connection at the time of initiating video saving, compression, and upload preparation. With this assessment made, the algorithm then executes a variable asset compression, saving, preparation, and uploading sequence based on achieving the best quality user experience in viewing quality and upload performance, optimizing for best mix of reduced upload latency and completion rates with replay quality.

In an example, the obtained first media content object is displayed, in the outputting step, in a post object that includes a graphical control that is user-selectable for activating an audio recorder to record audio limited to no longer than a predefined length; and the method further includes, responsive to finalization of the recording of the audio, inserting the audio as a reply to the first media content object, such that, in response to subsequent access of the of first media content object via the network, the first media content object is posted together with the audio as a sub-entry thereto. Still further, in an example embodiment, the predefined length is 5 minutes.

In an example, the first media content object includes video, audio, text, and/or an image.

In an example, a type of the second media content object is selectable from a plurality of at least two of the following types: video, audio, text, and image; and the type selected for the second media content object is not limited to a type of the first media content object.

In an example, the association packages the second media content object as a reply to the first media content object to cause the second media content object to be displayed as a sub-entry to the first media content object upon subsequent access of the first media content object via the network.

In an example, the recording of the second media content object includes appending a tag selected by the user input from an inventory of tags; each of the tags links to a respective media content object; and the tag is associated with a posting rule that restricts media content objects to which the tag is able to be appended.

In an example, the recording of the second media content object includes appending a tag selected by the user input from an inventory of tags; each of the tags links to a respective media content object; the first media content object and/or a post in which the first media content object is presented is associated with a posting rule that restricts which of a plurality of tags is able to be associated with the at least one of the first media content object and the post; and the appended tag is associated with the first media content object in response to a determination that the tag satisfies the posting rule. Still further, in an example embodiment, the rule restricts tags associable with the at least one of the first media object and the post to only tags in a tag store associated with an author of the at least one of the first media object and the post.

According to an example embodiment of the present invention, a non-transitory computer-readable medium includes, stored thereon, instructions that are executable by a processor, the instructions which, when executed by the processor, cause the processor to perform a method, the method including: obtaining, via a network, a first media content object attributed to a first user; outputting, via a graphical user interface display arrangement for a second user, the obtained first media content object; receiving user input by interaction with the graphical user interface arrangement; and, based on the user input, recording and transmitting over the network, a second media content object in association with the first media content object, where the second media content object includes at least one of video, audio, and an image.

According to an example embodiment of the present invention, a computer system includes a computer processor configured to: obtain, via a network, a first media content object attributed to a first user; output, via a graphical user interface display arrangement for a second user, the obtained first media content object; receive user input by interaction with the graphical user interface arrangement; and, based on the user input, record and transmit over the network, a second media content object in association with the first media content object, where the second media content object includes at least one of video, audio, and an image.

Tag/Link Creation, Management, and Monetization

According to an example embodiment, a computer-implemented method includes: maintaining, by a computer processor, a first set of user profiles identifying respective users as class A users and a second set of user profiles identifying respective users as class B users; and providing access, by the processor to users logged in via any of the first user profiles, to a graphical user interface (GUI) that is user-interactable for authoring links to content elements. The graphical user interface is not accessible by users logged in via any of the second user profiles, and, with respect to each of the authored links, the respective link is insertable into posts by a user logged in via the respective user profile with which the respective link was authored.

In an example, the method further includes, for each of at least one of the user profiles of the first set: storing a plurality of link group identifications in association with the respective user profile; and storing, for each of a subset of links authored using the respective profile, an association, set using the respective user profile, between the respective link and one or more of the link group identifications. The link group identifications are activatable and deactivatable by a user logged in via the respective user profile with which the link group identifications are associated, and, for all links of the subset, the respective link is functional, for linking to one or more content elements to which the respective link is set to link, only when either: (a) all link group identifications with which the respective link is associated are in an activated state or (b) at least one link group identification with which the respective is associated is in an activated state, such that the linking functionality of the respective link is deactivatable even after being published in a post. For example, in an example embodiment, each of the links associated with a link group identification links to a central system/network location, which tracks the activation state of the link group identifications, and accordingly, when accessed using the respective link, causes a processor to link or not to link to one or more content elements depending on the activation state of the associated link group identification (s).

In an example, each of the links includes a respective text string that is displayed when output in a post. Still further, in an example embodiment, all of the text strings include a same predefined character in a predetermined position of the respective text string. Still further, in an example embodiment, the predetermined position is the first character position of the text string.

In an example, with respect to each of the links, visible characteristics of the respective link, when output in a post, consist of a text string.

In an example, the GUI for authoring links includes components that are user-interactable for setting rules on use of an authored link by a user not logged in with the user profile with which the link was authored.

Still further, in an example embodiment, one of the settable rules is whether the respective link is reusable by users who are not logged in with the profile via which the respective link was authored for inclusion in posts authored by the users who are not logged in with the profile via which the respective link was authored.

Still further, in an example embodiment, one of the settable rules includes a time period during which the user not logged in with the user profile with which the link was authored is permitted to save the authored link for reuse.

Still further, in an example embodiment, one of the settable rules includes a time period during which the user not logged in with the user profile with which the link was authored is permitted to reuse the authored link.

Still further, in an example embodiment, one of the settable rules includes whether the user not logged in with the user profile with which the link was authored is permitted to reuse the authored link.

Still further, in an example embodiment, one of the settable rules includes whether the user not logged in with the user profile with which the link was authored is permitted to save the authored for reuse.

Still further, in an example embodiment, different rules are settable regarding permissions granted to users logged in via any of the class A profiles which is not the profile with which the link was authored and permissions granted to users logged in via any of the class B profiles. Still further, in an example embodiment, the settable rules include specification of one or more contexts in which a user not logged in via the user profile with which the link was authored is permitted or not permitted to save the link for reuse.

Further in this regard, in an example, the settable rules allow for differentiation between whether or not the link is provided to the user not logged in via the user profile with which the link was authored in an original post created using the user profile with which the link was authored. Still further, in an example, the settable rules allow for prohibiting saving of the link for reuse from within a reply post to an original post, which original post was created using the user profile with which the link was authored, but allowing for saving of the link for reuse from within the original post.

Further in regard to the specification of the one or more contexts, in an example embodiment, another differentiation for which the system is configured is that the settable rules allow for differentiation between which of a plurality of content providers provide a post in which the link is output to the user not logged in via the user profile with which the link was authored.

For example, according to an example embodiment, star tag links are programmable to provide different functionality depending on whether they are activated within a native network system in which the star tag is created (referred to herein as the Brabble system) or within an external system, e.g., FACEBOOK, TWITTER, INSTAGRAM, etc. Further, even where the star tag/link is selected from within the external system, the system allows for programming of different functionality depending on whether or not the link is selected in a device in which a user is already logged into the native system. For example, if a user is already logged into the native system on the device in which the link is selected within the external system, the link can be programmed to responsively cause navigation to the intended destination to which navigation would occur if the link was selected from within the native system.

Further in regard to the specification of the one or more contexts, in an example embodiment, the settable rules allow for permission for inclusion of the link into a post by a user not logged in via the user profile with which the link was authored to be made dependent on a type of content included in the post.

Further in regard to dependency on content type, in an example embodiment, text mining is used for identifying the content type of the post.

Further in regard to dependency on content type, in an example embodiment, image recognition is used for identifying the content type of the post.

In an example, the method further includes maintaining in association with one of the user profiles of the second set of user profiles a list of links that had been authored in association with a plurality of the first set of user profiles, wherein the links of the list are selected for inclusion in the list by a user logged in via the one of the user profiles of the second set.

In an example, the method further includes, for each of at least one of the links: tracking selections of the respective link by users not logged in via the respective user profile via which the respective link was authored; and updating a record of charges to one of the respective user profile via which the respective link was authored and an account associated with the respective user profile via which the respective link was authored to include a charge for the tracked selections.

According to an example embodiment of the present invention, a non-transitory computer-readable medium includes, stored thereon, instructions that are executable by a processor, the instructions which, when executed by the processor, cause the processor to perform a method, the method including: maintaining a first set of user profiles identifying respective users as class A users and a second set of user profiles identifying respective users as class B users; and providing access, to users logged in via any of the first user profiles, to a graphical user interface (GUI) that is user-interactable for authoring links to content elements. The graphical user interface is not accessible by users logged in via any of the second user profiles, and, with respect to each of the authored links, the respective link is insertable into posts by a user logged in via the respective user profile with which the respective link was authored.

According to an example embodiment of the present invention, a computer system includes a computer processor configured to: maintain a first set of user profiles identifying respective users as class A users and a second set of user profiles identifying respective users as class B users; and provide access, to users logged in via any of the first user profiles, to a graphical user interface (GUI) that is user-interactable for authoring links to content elements. The graphical user interface is not accessible by users logged in via any of the second user profiles, and, with respect to each of the authored links, the respective link is insertable into posts by a user logged in via the respective user profile with which the respective link was authored.

Tags/Links with Context-dependent Rules

According to an example embodiment, a computer-implemented method includes storing, by a computer processor, a link in association with a plurality of rules. The link is selectable, in a post-authoring environment, for insertion into a post to be published at a network accessible location. The link, subsequent to the insertion into the post, is selectable from within the post. The plurality of rules are configured to cause a processor to differently respond to the selection of the link from within the post, depending on a context in which the selection of the link from within the post occurs.

In an example, the responses to the selection of the link from within the post differ with respect to which of a plurality of content elements is output in response to the selection.

According to an example embodiment of the present invention, a non-transitory computer-readable medium includes, stored thereon, instructions that are executable by a processor, the instructions which, when executed by the processor, cause the processor to perform a method, the method including: storing a link in association with a plurality of rules. The link is selectable, in a post-authoring environment, for insertion into a post to be published at a network accessible location. The link, subsequent to the insertion into the post, is selectable from within the post. The plurality of rules are configured to cause a processor to differently respond to the selection of the link from within the post, depending on a context in which the selection of the link from within the post occurs.

According to an example embodiment of the present invention, a computer system includes a computer processor configured to: store a link in association with a plurality of rules. The link is selectable, in a post-authoring environment, for insertion into a post to be published at a network accessible location. The link, subsequent to the insertion into the post, is selectable from within the post. The plurality of rules are configured to cause a processor to differently respond to the selection of the link from within the post, depending on a context in which the selection of the link from within the post occurs, e.g., depending on whether the link is selected from within a native system/app in which the link is authored and/or managed or from within an external system/app.

Context-dependent Tan/Link Visibility

According to an example embodiment of the present invention, a computer-implemented method includes: publishing, by a computer processor, a post to a location accessible via a network, the post being associated with a link to at least one media content element; and transmitting copies of the post responsive to respective requests for the post published at the location, where the link is visible in only those of the copies transmitted in response to respective ones of the requests that meet predefined contextual conditions.

In an example, the contextual conditions are stored in association with the link prior to association of the link with the post.

In an example, the contextual conditions are stored in association with the post.

In an example, at least one of the contextual conditions is stored in association with the link prior to association of the link with the post and at least one of the contextual conditions is specific to the post and not applied to other posts including the link.

According to an example embodiment of the present invention, a non-transitory computer-readable medium includes, stored thereon, instructions that are executable by a processor, the instructions which, when executed by the processor, cause the processor to perform a method, the method including: publishing a post to a location accessible via a network, the post being associated with a link to at least one media content element; and transmitting copies of the post responsive to respective requests for the post published at the location, where the link is visible in only those of the copies transmitted in response to respective ones of the requests that meet predefined contextual conditions.

According to an example embodiment of the present invention, a computer system includes a computer processor configured to: publish a post to a location accessible via a network, the post being associated with a link to at least one media content element; and transmit copies of the post responsive to respective requests for the post published at the location, where the link is visible in only those of the copies transmitted in response to respective ones of the requests that meet predefined contextual conditions.

Creation of Posts with Tag/Links to Media Content

According to an example embodiment, a computer-implemented method includes: outputting, by a computer processor, a graphical user interface (GUI) that is configured for user interaction therewith to create a post for publishing at a location accessible via a network. The GUI includes a list of links that are each user-selectable for insertion in the post. Each of at least one of the links is configured such that, when the respective link is inserted into the post and the post is accessed via the network, the respective link is selectable from within the post to responsively provide a media content element to which the respective link points.

In an example, the list of links is a drop-down list.

In an example, the links of the list are those authored by the user, the user being a class A user who is provided access to an authoring environment in which to author links.

In an example, the links of the list are those (b) authored by one or more class A users who are provided access to an authoring environment in which to author the links, and (b) previously saved by a class B user who is not provided access to the authoring environment in which to author such links, and the list is provided to the class B user from which the class B user can select one or more of the links of the list for inclusion in the post.

According to an example embodiment of the present invention, a non-transitory computer-readable medium includes, stored thereon, instructions that are executable by a processor, the instructions which, when executed by the processor, cause the processor to perform a method, the method including: outputting a graphical user interface (GUI) that is configured for user interaction therewith to create a post for publishing at a location accessible via a network. The GUI includes a list of links that are each user-selectable for insertion in the post. Each of at least one of the links is configured such that, when the respective link is inserted into the post and the post is accessed via the network, the respective link is selectable from within the post to responsively provide a media content element to which the respective link points.

According to an example embodiment of the present invention, a computer system includes a computer processor configured to: output a graphical user interface (GUI) that is configured for user interaction therewith to create a post for publishing at a location accessible via a network. The GUI includes a list of links that are each user-selectable for insertion in the post. Each of at least one of the links is configured such that, when the respective link is inserted into the post and the post is accessed via the network, the respective link is selectable from within the post to responsively provide a media content element to which the respective link points.

Saving Tags/Links Authored by Other Users

According to an example embodiment of the present invention, a computer-implemented method includes outputting, by a computer processor, a post that includes a link that is selectable via a first selection event to responsively cause the processor to output a media content element and that is selectable by a user via a second selection event to cause the processor to one of (a) responsively save the link to a store of links accessible by the user for insertion into a post authored by the user and (b) responsively output an option that is selectable to responsively save the link to the store of links.

As described below, in an example embodiment, an authoring environment is provided to a user by which to create the links and program the links to allow or disallow such saving of the links by other users to the link stores of such other users.

According to an example embodiment of the present invention, a non-transitory computer-readable medium includes, stored thereon, instructions that are executable by a processor, the instructions which, when executed by the processor, cause the processor to perform a method, the method including: outputting a post that includes a link that is selectable via a first selection event to responsively cause the processor to output a media content element and that is selectable by a user via a second selection event to cause the processor to one of (a) responsively save the link to a store of links accessible by the user for insertion into a post authored by the user and (b) responsively output an option that is selectable to responsively save the link to the store of links.

According to an example embodiment of the present invention, a computer system includes a computer processor configured to: output a post that includes a link that is selectable via a first selection event to responsively cause the processor to output a media content element and that is selectable by a user via a second selection event to cause the processor to one of (a) responsively save the link to a store of links accessible by the user for insertion into a post authored by the user and (b) responsively output an option that is selectable to responsively save the link to the store of links

Appending/Inserting Tags/Links to Posts

According to an example embodiment, a computer-implemented method includes: obtaining, by a computer processor, a tag from a store that includes a plurality of tags, the store being associated with a first user, and the tag linking to a media content object; and appending or, more specifically, inserting the tag, by the processor, to a post that is accessible via a network for consumption, where the appending is based on the association of the tag with the first user.

In an example, the post originates from an authoring by the first user, and only tags by the first user are appendible or insertable to the post.

According to an example embodiment of the present invention, a non-transitory computer-readable medium includes, stored thereon, instructions that are executable by a processor, the instructions which, when executed by the processor, cause the processor to perform a method, the method including: obtaining a tag from a store that includes a plurality of tags, the store being associated with a first user, and the tag linking to a media content object; and appending or inserting the tag to a post that is accessible via a network for consumption, where the appending is based on the association of the tag with the first user.

According to an example embodiment of the present invention, a computer system includes a computer processor configured to: obtain a tag from a store that includes a plurality of tags, the store being associated with a first user, and the tag linking to a media content object; and append the tag to a post that is accessible via a network for consumption, where the appending is based on the association of the tag with the first user

Automatic Tan/Link Insertion into Reply/Response Post

According to an example embodiment, a computer-implemented method includes: obtaining, by a computer processor and via a network, a first post that is attributed to a first user and that includes a user-selectable link to a content element arrangement; outputting, by the processor and via a graphical user interface display arrangement for a second user, the obtained first post; receiving, by the processor, user input by interaction with the graphical user interface arrangement to create and publish a reply post to the obtained first post; and responsive to the user input, generating and publishing, by the processor, a reply post structure that includes the first post with the user-selectable link and the reply post with the user-selectable link, the processor automatically inserting the user-selectable link into the reply post. In an example, the content element arrangement to which the link links varies depending on whether the link is selected from within the first post or within the reply post. For example, in an example embodiment, the links initially link to a central network location for further linking to content elements based on the specific link used to access the central location and the context in which the link was selected, e.g., whether from within the source post or the reply post. The content elements to which the further linking occurs is, according to an example embodiment, managed at the central location which includes rules set by the author of the link. Further, such rules at the central location can be varied by the user over time, to change the content elements to which the links link. Further, according to an example embodiment, the links include meta tracking components for indicating to the central network location a context in which the link was selected, which allows for context-dependent decisions as further described below.

According to an example embodiment of the present invention, a non-transitory computer-readable medium, includes, stored thereon, instructions that are executable by a processor, the instructions which, when executed by the processor, cause the processor to perform a method, the method including: obtaining, via a network, a first post that is attributed to a first user and that includes a user-selectable link to a content element arrangement; outputting, via a graphical user interface display arrangement for a second user, the obtained first post; receiving user input by interaction with the graphical user interface arrangement to create and publish a reply post to the obtained first post; and, responsive to the user input, generating and publishing a reply post structure that includes the first post with the user-selectable link and the reply post with the user-selectable link, the processor automatically inserting the user-selectable link into the reply post. In an example, the content element arrangement to which the link links varies depending on whether the link is selected from within the first post or within the reply post.

According to an example embodiment of the present invention, a computer system includes a computer processor configured to: obtain, via a network, a first post that is attributed to a first user and that includes a user-selectable link to a content element arrangement; output, via a graphical user interface display arrangement for a second user, the obtained first post; receive user input by interaction with the graphical user interface arrangement to create and publish a reply post to the obtained first post; and, responsive to the user input, generate and publish a reply post structure that includes the first post with the user-selectable link and the reply post with the user-selectable link, the processor automatically inserting the user-selectable link into the reply post. In an example, the content element arrangement to which the link links varies depending on whether the link is selected from within the first post or within the reply post.

Selective Blocking of Insertion of Tags/Links in Reply Posts

According to an example embodiment of the present invention, a computer-implemented method includes: obtaining, by a computer processor and via a network, a first post that is attributed to a first user; outputting, by the processor and via a graphical user interface display arrangement for a second user, the obtained first post; and receiving, by the processor, user input by interaction with the graphical user interface arrangement to create and publish a reply post to the obtained first post, the reply post including one of a plurality of links to media content elements. For the creation and publishing of the reply post, the processor blocks inclusion in the published reply post of a particular link of the plurality of links based on an association of the particular link with a different user than the first user.

According to an example embodiment of the present invention, a non-transitory computer-readable medium, includes, stored thereon, instructions that are executable by a processor, the instructions which, when executed by the processor, cause the processor to perform a method, the method including: obtaining, via a network, a first post that is attributed to a first user; outputting, via a graphical user interface display arrangement for a second user, the obtained first post; and receiving user input by interaction with the graphical user interface arrangement to create and publish a reply post to the obtained first post, the reply post including one of a plurality of links to media content elements. For the creation and publishing of the reply post, the processor blocks inclusion in the published reply post of a particular link of the plurality of links based on an association of the particular link with a different user than the first user.

According to an example embodiment of the present invention, a computer system includes a computer processor configured to: obtain, via a network, a first post that is attributed to a first user; output, via a graphical user interface display arrangement for a second user, the obtained first post; and receive user input by interaction with the graphical user interface arrangement to create and publish a reply post to the obtained first post, the reply post including one of a plurality of links to media content elements. For the creation and publishing of the reply post, the processor blocks inclusion in the published reply post of a particular link of the plurality of links based on an association of the particular link with a different user than the first user.

Public System-wide Feeds Pane

According to an example embodiment, a computer-implemented method includes: aggregating, by a computer processor, postings authored by a plurality of users of a system and posted by the plurality of users to user pages of the system that are associated with respective users of the system; and publishing, by the processor, a system-wide feeds page that is accessible to all users of a system and that includes all of the aggregated postings.

In an example, only those postings set as publicly available are aggregated for the system-wide feeds page.

In an example, the system-wide feeds page is continuously updated as new postings are posted in the system.

Still further, in an example embodiment, the update is performed in real-time.

Still further, in an example embodiment, the update includes updating a display of the system-wide feeds page to display the new postings without requiring a refresh of the system-wide feeds page.

In an example, the aggregated postings are arranged in the system-wide feeds page in chronological order of their respective postings to the user pages.

According to an example embodiment of the present invention, a non-transitory computer-readable medium, includes, stored thereon, instructions that are executable by a processor, the instructions which, when executed by the processor, cause the processor to perform a method, the method including: aggregating postings authored by a plurality of users of a system and posted by the plurality of users to user pages of the system that are associated with respective users of the system; and publishing a system-wide feeds page that is accessible to all users of a system and that includes all of the aggregated postings.

According to an example embodiment of the present invention, a computer system includes a computer processor configured to: aggregate postings authored by a plurality of users of a system and posted by the plurality of users to user pages of the system that are associated with respective users of the system; and publish a system-wide feeds page that is accessible to all users of a system and that includes all of the aggregated postings.

DETAILED DESCRIPTION

Figure 1:
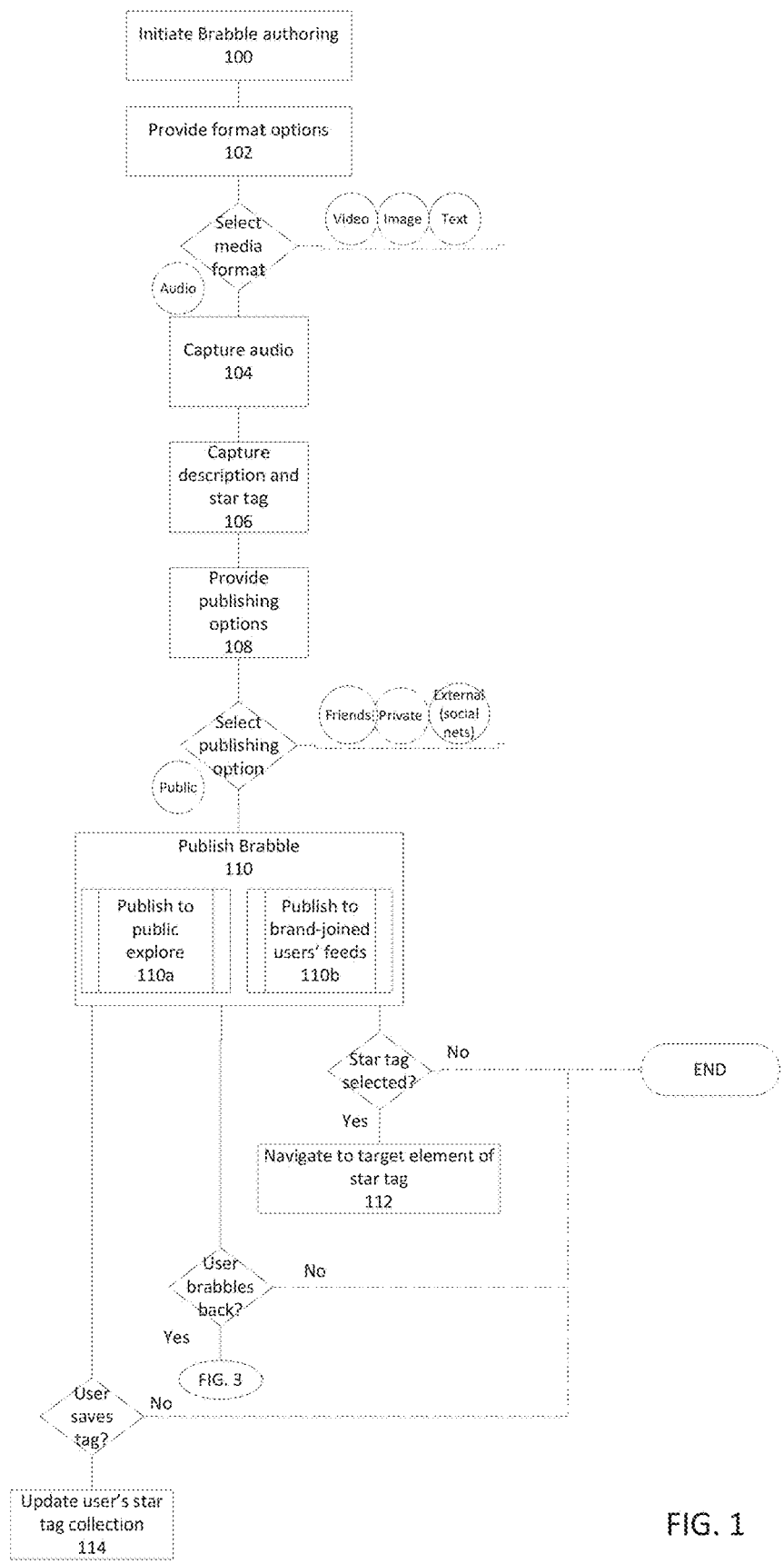
FIG. 1 is a flowchart that illustrates an example procedure for a class A user (also referred to herein as a brand user or a first tier user) to author and publish a Brabble and for another user to interact with the Brabble, according to an example embodiment of the present invention.

Example embodiments of the present invention provide a system that facilitates social networking in a media-centric manner, to pique consumer's interests and allow users to disseminate their personal expression and originality in an interactive manner, with users posting using media (e.g., in multi-media formats) and responding using response media (e.g., in multi-media formats). Such collaborative creation among users, particularly, where centered about a brand's original disseminated media, allows such brands to garner increased interest in the brand and its products and/or services, thereby facilitating increased monetization of their social audiences via this disseminated media.

Additionally and/or alternatively, example embodiments of the present invention facilitate the linking of content elements, e.g., media content elements, to further content elements in an effortless, seamless, and intuitive manner thereby allowing brands to further monetize their output media content elements by association with other content elements that, for example, may more directly lead to increased financial returns on their products or services.

According to an example embodiment, a system facilitates connection between brands, users and communities via socially shared content elements, referred to herein as "Brabbles." Unlike other currently available socially shared content elements, Brabbles are multimedia elements including, for example, video, audio, image/picture and/or text, that are in multimedia format both when originally created and shared as well as when they are responded to, the multimedia responses being referred to herein as Brabblebacks. Specifically, according to example embodiments of the present invention, the system integrates an authoring and publishing environment both for source posts and sub/response posts (Brabblebacks). For example, according to an example embodiment of the present invention, the system includes a user-interactive interface that begins a posting sequence by providing an authoring environment in which a user creates a media content element (Brabble), and, responsive to completion of the Brabble creation, provides a user interface element for posting of the created Brabble. The Brabble is accordingly posted for view and interaction thereof by other users. Such interaction includes user replies (Brabblebacks), for example, posted in association with, e.g., as a hierarchical child of, the initial Brabble. According to an example embodiment, the system provides a response sequence using an interface that includes an authoring environment for creating a further media (e.g., multi-media) content element as the reply post or as a part of the reply post.

According to an example embodiment, the system provides a further authoring environment for a user to create user-owned media content element links (also referred to herein as star tags) that are assigned unique system IDs, which IDs the users, e.g., of a defined class, can also author. According to an example embodiment, the system provides for the user/author to assign to the links programmable characteristics. (According to an alternative example embodiment, the IDs authored by the user only need be unique among other star tags created by the user, with the system appending to the ID a further indication (which can either be visible or non-visible when used) of the particular user, thereby differentiating between tags of different users). The system stores the user created star tags. The star tags are associated by the user (the star tag owner) with Brabbles the user has created or with the user's system landing page (or with any other webpage). When authoring a new Brabble, the user can enter and associate with the new Brabble a description of such authored Brabble. The user can insert in the description one or more of the star tags of the system. According to an example embodiment, for original Brabbles, the system restricts inclusion of only those star tags "owned" or created by the user who is authoring the Brabble, but, for Brabblebacks, allows the replying user who authors the Brabbleback to include any (and only) of the star tags owned or created by the original Brabbler (the user who authored the original Brabble to which this responding user is now brabbling back). This allows a user, e.g., a company or brand, to create an environment in which a community of users interact with links that direct the various users to media content elements of that company or brand (e.g., by directing the interfaces of the community of users interacting with the links to the linked to by the programmable star tags), increasing exposure of the community of users to the company or brand's various content elements and/or pages. Thus, users are provided with a content element experience centered on that company or brand facilitating increased monetization of the company's media content elements. (According to alternative example embodiments, the system allows original Brabble authors to include star tags owned by other users, e.g., in accordance with permission settings for such usage of the star tags set by the star tag owners (e.g., the author of the star tag), but limits Brabblebacks to only those star tags owned by the original brabbler.)

According to an example embodiment, all users are able to create an inventory of original star tags owned by that user.

According to an alternative example embodiment, the system only provides for users associated with a particular profile class(es), e.g., a certain system member type, to create and own star tags, so that only all users of the particular profile class (e.g., including brands, publishers, product owners, and companies) are able to create the inventory of original star tags owned by respective ones of those users. For example, a user can sign up as a company or brand, such membership allowing the user to create star tags. For example, the system can implement a fee structure whereby users signed up as brands must pay a fee to an entity providing access to the system, whereas other users do not have to pay a fee or pay a lower fee. According to an example embodiment, the system is configured for charging such users per star tag the user creates and/or a range of fees associated with the eventual activation of the star tags by users of the system who engage with the star tags in a range of ways including clicking the star tags, saving the star tags, and/or sharing the star tags. Such associated fees may include revenue sharing arrangements between the star tag owner and the system provider, cost per acquisition (CPA) fees, cost per click (CPC) fees, and/or sponsorship fees. A user may use a star tag created by another user, for example, if the star tag owner has assigned to the star tag appropriate permissions associated with its capture and reuse by other non-owner users. In fact, it is beneficial for a star tag owner's tags to be used by other users in the posts of such other users because it increases exposure of the star tag owner's media to other users, e.g., both internal and external to the Brabble system.

According to an example embodiment, if a first user is associated with a profile which allows the first user to create star tags, then, when a second user brabbles back to a brabble of the first user, the only star tags the system allows the second user to insert into the Brabbleback are those owned by the first user (and, according to an example embodiment, such Brabblebacks are automatically populated with the first user's star tags which populated the Brabble to which the Brabble back responds, if the Brabble indeed included one or more star tags); but, if the first user, who initially brabbled (i.e., posted the source post being responded to), is not associated with such a profile, then, when the second user brabbles back to a brabble of the first user, the system allows the second user to include star tags owned by any other user (according to an example embodiment in which such re-use and sharing of a first user's star tag is enabled and permitted).

Thus, according to an example embodiment of the present invention, the system provides a paradigm including different tiers of users, including those of a first tier using the system for commercialization of their products and services, and those of a second lower tier using the system for general expression, interest, and exploration. The system is organized to encourage the second tier users to interact with media content of the first tier of users, thereby facilitating increased monetization of the first tier users' media content elements. This paradigm affords the first tier users a high degree of control of their own content elements to provide continued focus on an entire environment of their content elements and increase traffic of their elements, while also allowing other users freedom to use the content elements of the first tier users in the Brabbles created by the second tier users for further exposure for the first tier users.

Additionally, as described above, the system integrates an authoring and publishing environment, which allows the media content element created by the first tier users to be further enhanced by still more interesting media content elements created by responding second tier users. Thus, the first tier users capitalize on the ingenuity and originality of the second tier users, where the community of users can enjoy an exponentially growing and dynamic multimedia experience with multiple contributors, while encouraged to further contribute thereto by authoring responsive multimedia, further generating traffic and exposure of the first tier users' content elements.

According to an example embodiment, this community-fueled enhancement of the first tier users' content elements, is further enhanced by organization and connection through the use of the unique embedded star tags within the content elements, thus creating highly efficient and monetizable distribution of the first tier users' content, which is distributed and shared organically by cooperating second tier users.

According to an example embodiment of the present invention, the system further enhances media exposure by generating and outputting a system-hosted landing page or mobile application feed in which public Brabbles created by all of the system users are combined in an on-going feed, e.g., in chronological order of posting time. Moreover, according to an example embodiment, Brabblebacks are included in the combined public feed in a manner that graphically associates the Brabblebacks with the Brabbles to which they belong. For example, offsetting can be used to show that Brabblebacks belong to a certain Brabble, e.g., all Brabblebacks of a Brabble being placed under the Brabble and being aligned indented with respect to the Brabble.

Such a system-hosted page further increases the exposure of the users, including, importantly, the first tier users and their content elements, by publishing their Brabbles, i.e., content elements, at a location whose viewing is not dependent on the particular associations member users have made with each other. For example, viewing of the combined public feed by a first user is not dependent on the particular other users with whom the first user is formally associated by the system (e.g., it is not dependent on whom the first user has "friended" and/or "followed"), and, further, the combined public feed is not restricted to posts by any one of the users.

Thus, according to an example embodiment, the system provides for a first user to post a multimedia content element, and for a second user to input a reply or response associated with the first user's input, e.g., as a response thereto, where the second user's response itself also includes multimedia content, e.g., a video. The system creates a social media engagement and distribution capability of dynamic, interactive impressions linking users to users and users to brands around shared "day in the life" moments, capture, share, and respond functionality of the system is mobile and untethered, integrating social media authoring with publication and response functionality, and further facilitating increased exposure of the brands' social media by allowing a web of links thereto.

According to an example embodiment, the platform enables selective sharing of each individual content element. Users can choose to share with the entire community, their linked friends/followers, or to a selected one or more users from their list of social contacts. The user experience provided by the system and method of the present invention creates a sustainable stickiness for members, capturing, creating, sharing, and responding to each other interactively in multiple media formats and using various dissemination options.

According to example embodiments of the present invention, a computer-implemented platform provides for interactive engagement customized for use by one or more particular users, brands, or communities using tags, e.g., programmable tags, embedded within one or more specific content media elements, which pertain to one or more social interactions of content capture, creation, publishing, sharing, and/or responding interactively using access and distribution methods of connected mobile or fixed web devices for personal interactions, commercial integrations and collaborative experiences managed in a dynamic, constantly connected manner via a range of personal media content types including video, image/picture, audio, text, and/or tags.

Figure 2:
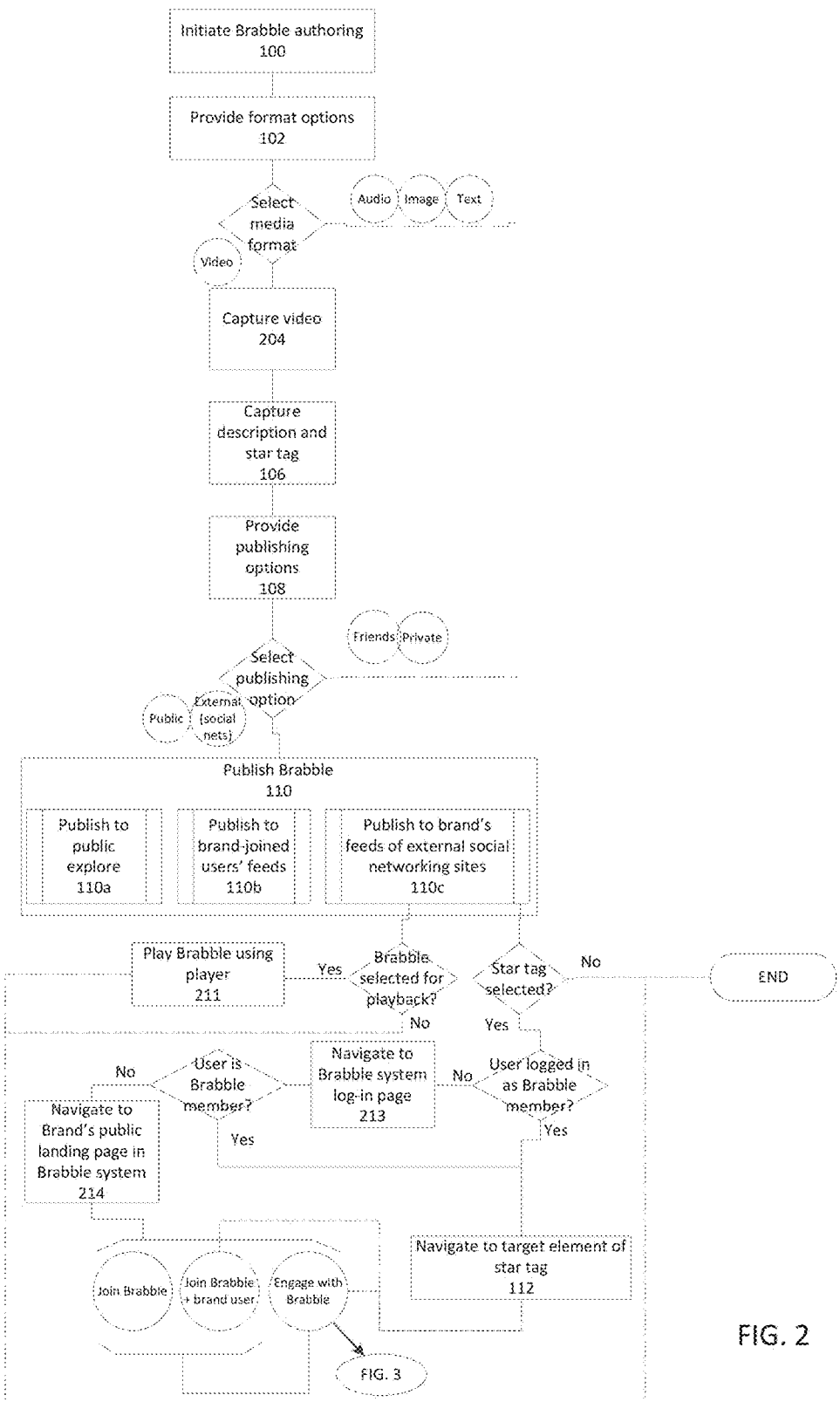
FIG. 2 is a flowchart that illustrates an example procedure for a brand user to author and publish a Brabble and for another user to interact with the Brabble, where the Brabble is published to an external social networking system, according to an example embodiment of the present invention.

FIGS. 1 to 6 are flowcharts that show various example flows that can be implemented according to example embodiments of the present inventions. Various ones of those flows show respective complete sequences depending on illustrated user selections to proceed along such respective sequence branches, and portions of some of the sequences of some of the flowcharts are also applicable as alternative branches for, but not illustrated in, some of the flows of the other flowcharts. For example, FIG. 1 shows selection of "audio" for authoring of a media element, while FIG. 2 shows selection of "video" for authoring of a media element, but both selections are options for both of FIGS. 1 and 2. Indeed, study of the flowcharts, in conjunction with the description of example embodiments of the present invention, as described above, and as further detailed in describing the steps of the flowcharts, makes it apparent that various sub-graphs of the various flowcharts can be mixed and matched with each other depending on user-selection in interacting with the system, although certain flows may be restricted depending on user-type of a current author or of the author of a Brabble being responded to, as explained in detail above.

FIG. 1 is a flowchart that illustrates an example method for a brand to disseminate media content elements, Brabbles, to other users of an internal system (also referred to herein as the "Brabble system"). At step 100, a brand-type user (a user signed up to the Brabble system with a brand profile and rights, also referred to herein as a class A user) selects a user interface element interpreted by the processor as an instruction to begin an authoring process to author a Brabble. At step 102, the system responsively provides an authoring environment in which the user can select a media format for the Brabble being authored. For example, the user can select whether to author an audio object, a video object, and image object, or a text object. FIG. 1 shows that the user has selected audio. Accordingly, at step 104, the system captures an audio element. For example, the system provides a control in response to selection of which the system activates a microphone for capturing audio input and storing it in an audio file, for example, with the recording being terminated in response to a user-input termination instruction, such as another selection of a record button.

According to an example embodiment, the system provides a graphical user interface in which to receive, via user-interaction therewith, user input of a description associated with the authored media element, in this case the recorded audio file. Further, as described above, the system is configured for such a description to include a star tag, e.g., a text string previously defined by the brand user with defined functionality for linking to another Brabble of the brand user or any other defined content or page to experience as programmed by the brand user. For example, the user can type in a previously defined star tag and/or can select to open a listing of such previously defined star tags that are available for use by the user. Accordingly, at step 106, the system captures a description and star tag, which the system associates with the newly authored audio content element (the newly authored audio Brabble). (The user has the option of inputting a description without a star tag for association with the newly created audio Brabble, or even to forego a description altogether.)

Upon completion of the creation of the media element, in this case the audio Brabble, and/or the associated description, the system immediately provides a publishing selection control. For example, according to an example embodiment, in response to the completion of the Brabble authoring, the system navigates to a publishing selection screen. Alternatively, a publishing selection control in included in a same page in which the controls for authoring the Brabble are provided. The control can include a list of publishing options. According to an example embodiment of the present invention, more than one of the options can be selected together. For example, the system displays a list of publishing options more than one of which can be selected by the user, the Brabble accordingly being published according to all of the selected publishing options. On the other hand, one or more of the publishing options may be inconsistent with one or more others of the publishing options, and, therefore, responsive to selection of one of those options, the system deactivates the other inconsistent options. Thus, at step 108, the system provides selectable publishing options. It is noted that, according to example embodiments, the publishing selection control and the Brabble authoring control can be displayed on a single authoring/publishing page, and, according to an example embodiment, the user can choose whether to first select a publishing option and then author the Brabble, or to instead first author the Brabble, and then select a publishing option.

According to an example embodiment, some of the selectable options include "Public," "Friends," "Private," and "External." FIG. 1 shows a scenario where the brand user, who has authored the audio Brabble, has selected "Public." Accordingly, at step 110, the system publishes the Brabble according to the Public selection. Publishing the Brabble according to the Public selection includes, at step 110*a*, publishing the Brabble to the combined public feed, referred to herein as the Explore, in which the system includes the public Brabbles of all of the system members, e.g., in a chronological or weighted order of posting, which public explore is accessible to all of the Brabble system users regardless of their system relationships to the publishing users and regardless of their having signed up as members of the system, as described above. With respect to weights, according to an example embodiment, different users will be provided with the Brabbles of the public feed in different orders, frequencies, and/or rotation, depending on the respective user's tracked usage of the system and/or friends, followers, or those the users' are following. (According to an alternative example embodiment, a user must be a member of and logged into the system to be able to access the public explore feed.) According to an alternative example embodiment, the system provides for categorization of Brabbles, with different public explore pages for different ones of the categories. According to an alternative example embodiment, the public explore includes the combination of all of the public Brabbles of all of the Brabble system members, accessible by all of the Brabble system users, but the public explore page includes filter options by which an accessing user can filter, e.g., by category, date range, content media format, star tag, and/or author type, which of the Brabbles are displayed for the instantiation of the public explore page for the accessing user.

Publishing the Brabble according to the Public selection further includes, at step 110b, publishing the Brabble to the page feeds of each of the Brabble system members who have "joined" the brand. For example, a Brabble system member can select a "join" and/or "friend" option at the brand's landing page for becoming a "friend" or "subscriber/follower" of the brand. When the brand publishes a Brabble as public, the system accordingly publishes the Brabble to the personal feed of the member who has become such a friend/follower/subscriber of the brand (as well as to the public feed or Explore). According to an alternative example embodiment, the Public selection only causes the Brabble to publish in the public Explore page (and/or in the publishing user's own page which can be visited by others), but does not publish to the feeds or pages of "friends" or "followers," a separate publishing option being used for publication to the feeds and/or pages of the "friends" or "followers." According to this alternative example embodiment, these publication options, i.e., "Public" or "Friends and Followers" are mutually exclusive publishing options.

While not shown in any of the figures, according to an example embodiment, the system also publishes the Brabble to a profile page of the publishing user, where the ability for other users to view the feeds of the profile page of the publishing user depends, on a Brabble by Brabble basis, on the respective publishing option for that particular Brabble. For example, if a Brabble is restricted to only certain users, that Brabble is viewable on the publishing user's profile page only to those certain users. This publishing feature (of publishing to the publishing user's profile page) is applicable, according to an example embodiment, to all of the selectable publishing options.

When a member views the Brabble of the Brabble publisher in the public feed or in the publishing user's feeds, the viewing member can select an option, provided with the Brabble being viewed, to join/follow (e.g., become a friend of or subscriber to) the Brabble publishing user. If the viewing member indeed friends or joins the Brabble publishing user, the viewing member's feeds are populated with Brabbles of the publishing user that have been published as public or to the publishing user's "friends."

If a first member follows a second member, the first member is then exposed to the second member's Brabble when the second member chooses to publish that Brabble to "friends and followers." However, the second member will not necessarily be exposed to Brabbles the first member creates and shares to the first member's "friends and followers." Thus, "friends and followers" creates a unique asynchronous sharing relationship between the two members. However, if or when the second user should choose to also "follow" the first member who is currently following the second member, a unique aspect of the system provides an automatic resetting of the relationship between the two members such that they are now in a synchronous sharing relationship and their mutual relationship status is automatically upgraded to make both members "friends" of each other, so that the first member will be exposed to Brabbles created by the second member when such Brabbles are shared with "friends and followers" and the second member will now also be exposed to Brabbles created by the first member when such Brabbles are share with "friends and followers."

As described above, the Brabble can include a star tag which, when selected, links to another Brabble or, for example, to a landing page of the brand. FIG. 1 further shows steps associated with such a selection (although a Brabble can be viewed without further interaction including the selection of the star tag). Accordingly, at step 112, in response to selection of the star tag, the system navigates, in the user interface of the viewing user, to the Brabble or landing page to which the star tag links. For example, the Brabble being linked to may be within the brand's profile page (e.g., including the brand's feeds), and, upon selection of the star tag, according to an example embodiment, the system navigates to the brand's profile page, and specifically to the portion thereof including the Brabble to which the star tag links. According to an example embodiment, if the Brabble to which the star tag links is playable media, the system also automatically plays the media and/or opens the Brabble as programmed within the star tag defined logic. Alternatively, the system navigates to the Brabble, and subsequently opens or plays the Brabble in response to a user-selection of a control for opening or playing the Brabble. Additionally, according to an example embodiment, once the user navigates to the Brabble to which the star tag links, the user is able to brabble back to the Brabble to which the star tag links. Similarly, the Brabble to which the star tag links may itself include a further selectable star tag and/or other programmable links associated with that star tag and embedded within the description area of the associated Brabble. A user can also brabble back to the published Brabble, discussed in further detail with respect to FIG. 3.

According to an example embodiment, a user can also select to save the star tag of the Brabble, in response to which the system, at step 114, responsively updates a stored star tag collection associated with that user. For example, a viewing user can select to save star tags of a number of first tier brand-type members in a star tag collection accessible for browsing by the viewing user for insertion in Brabbles the viewing user later creates. According to an example embodiment, such reuse of first tier user created star tags by second tier users is controlled and limited to the allowable reuse and re-share usages set by the first tier users when the first tier users create and define the business rules associated with their programmable star tags.

Although the saving of the tag, the brabbling back, and the star tag selection are shown as alternatives, the viewing user can do more than one of them. For example, the user can select to save the tag, then brabble back, and then select the star tag; or brabble back, then select to save the tag, and then select the star tag; or the user can select the star tag, and then cycle back to view the Brabble, and select one or both of the other options.

FIG. 2 is a flowchart that illustrates an example method for a brand to disseminate media content elements, Brabbles, to users of an external system, e.g., an external social networking system. FIG. 2 includes some of the steps already described above with respect to FIG. 1. However, unlike FIG. 1, FIG. 2 shows the selection of video as the media format, instead of audio, and accordingly shows step 204 in which the system captures video. For example, the system activates a video camera which the system recognizes to be available to the system (and/or a user interface control of the video camera). Additionally, with respect to the publishing options, FIG. 2 shows two selections, including selection of "Public," which has already been described above with respect to FIG. 1, and "External." Accordingly, besides for steps 110a and 110b described above with respect to FIG. 1, step 110 further includes step 110c in which the system outputs the Brabble to an external linked social network system selected by the publishing user (in this case the brand user) and of which the publishing user is a member (or all social networks of which the publishing user is a member, which the publishing user has linked to the publishing user's Brabble system profile, and to which the Brabble system can link via integrated and authorized application programming interfaces (APIs)). For example, if the publishing user selects to have the Brabble output to a linked Facebook® account, the system outputs the Brabble to the Facebook® account for display as a Facebook® post by the publishing user. The locations of the external social network in which the Brabble publishes may be dependent on the rules of the external social network for publishing posts authored by a user of that external social network. For example, the external social network can provide for a user's authored posts to appear in that user's feeds page and also in the feeds of all of that user's "friends" within that external social network. According to an example embodiment, when a Brabble containing a star tag is shared outside of the Brabble network, e.g., within other social networks and websites, the Brabble will support the planned objective of monetizing the social web for Brabble brand advertisers who pay for the reach and activation potential derived from publicly encountered Brabble star tags being activated by users across the social web.

FIG. 1 shows various options for the Brabble as published within the Brabble system. Those options continue to apply for the publication of the Brabble according to steps 110a and 110b in FIG. 2, but are not shown again in FIG. 2. FIG. 2 shows further steps concerning the Brabble published in the feeds, pages, and/or native applications of the external, linked social networking system. As an initial matter, it is noted that the published Brabble media, in this case the video, is playable in the external social networking environment, at step 211, for example, using a custom player encapsulated with, e.g., embedded in, the Brabble provided at the external social networking site. For some sites, a native player of the external site, or a player which the external site allows to be used, can be used for the playing of, and/or engagement with, the Brabble. Additionally, according to an example embodiment, the star tag is also selectable. In this regard, according to an example embodiment, at step 110c, the system encapsulates the star tag in a uniform resource locator (URL) linked to a Brabble system page, which then processes the selection of the star tag. According to an alternative example embodiment, the Brabble system embeds in the Brabble an application that controls interpretation of the Brabble selection, and handles the responsive navigation according to the linking parameters of the star tag. According to an example embodiment, the way the star tag selection is handled depends on a contextual environment of its selection, e.g., the handling can depend on the contextual environment from within which the clicking takes place, for example, whether the star tag is activated (e.g., clicked on) in an external social network or within the Brabble system.

According to an example embodiment, the way the system handles the selection of the star tag depends on whether the selecting user is already a Brabble system member and logged into the Brabble system. For example, according to an example embodiment, if the user is a Brabble system member and logged in, the system proceeds to perform step 112, described above with respect to FIG. 1. For example, according to an example embodiment, the system navigates to a particular portion of a profile page of the Brabble authoring user, which portion includes the Brabble linked to by the star tag. As described above, according to an example embodiment, the Brabble includes an embedded application for handling the star tag selection, and, according to such embodiment, the application determines whether the user is logged into a Brabble system session.

If the user is not logged in as a Brabble member, the application stores a star tag state indicating the star tag that had been selected, but, at step 213, navigates to a log-in page of the Brabble system. If the user is a member and is currently logged into the Brabble system from the computing device with which the user is interacting with the star tag, the system automatically proceeds to step 112 to navigate within a user interface of the Brabble system to the content element and/or page to which the star tag links, using the stored star tag state. If the user is a member but is not currently logged into the Brabble system, the user is able to log in at the log-in page, the system then proceeds to step 112 to navigate within a user interface of the Brabble system to the content element and/or page to which the star tag links, using the stored star tag state.

If the user does not log in as a Brabble system member, e.g., selects a element indicating that the user is not a registered member of the system, the system instead, at step 214, navigates, based on the stored star tag state, indicating the star tag that had been selected, to a custom page of the brand including the content element to which the star tag links, but customized for viewing by non-Brabble system users. The custom page navigated to in step 214 includes links for joining the Brabble system, joining the Brabble system and also joining/following the brand within the Brabble system, and/or engaging with the Brabble to which the selected star tag links. It is noted that there may be some limitations for such engagement by a non-Brabble system member compared to engagement occurring within the Brabble system, i.e., by a Brabble system member. As shown in FIG. 2, if the user selects to sign up as a member of the Brabble system and/or as a friend or follower of the brand user, the user can thereafter still proceed to engage with the Brabble to which the star tag links. For example, based on the stored system state, the Brabble system automatically navigates within the Brabble system user interface to the content element and/or page to which the previously selected star tag links responsive to completion of the sign-up to the Brabble system and/or the joining as a friend or follower of the brand user.

According to an example embodiment, also in the case where the viewing user is a member of the Brabble system, but has not previously joined the brand, the viewing user is presented with a control selectable for requesting to join the brand (represented by the dashed line at the output of step 112).

Figure 3:
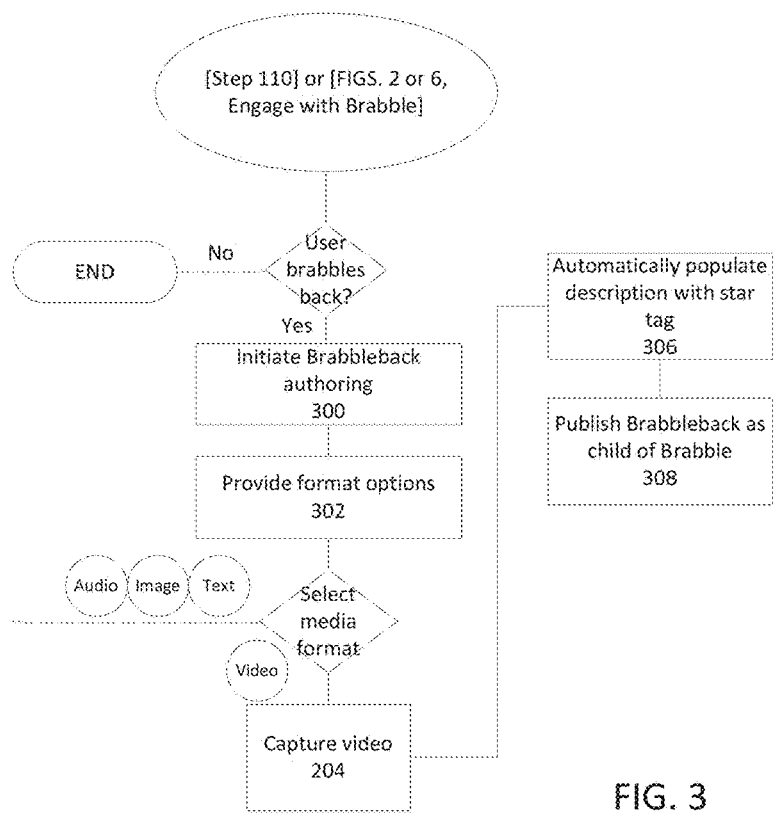
FIG. 3 is a flowchart that illustrates an example procedure for brabbling back to a brand's source Brabble, according to an example embodiment of the present invention.

Referring back to FIG. 1, as noted above, FIG. 1 shows that one of the options for user interaction with a published Brabble is to respond by creating a Brabbleback. FIG. 3 shown steps for creating a Brabbleback to a brand user's Brabble. According to an example embodiment, if the user selects to brabble back to the brand user's Brabble, the system, at step 300, receives an instruction input by the user which the system interprets as an instruction to initiate Brabbleback authoring. At step 302, the system provides format options, as described with respect to step 102 (for the initial Brabble creation), which options include, for example, audio, video, image, or text. FIG. 3 shows video as having been selected, and accordingly proceeds to step 204 to record video. Upon completion of the video capture, in a case where the Brabble to which the video is a Brabbleback is associated with a description including one of more star tags, the system, at step 306, responsively automatically creates a description associated with the Brabbleback video, the description being populated automatically with all star tags populating the description of the Brabble to which the Brabbleback responds. The user can further revise the description to include additional descriptive text.

According to an example embodiment, in a case where the original Brabble to which the Brableback responds does not include any star tags, step 306 is omitted, but the user has the option to add a description.

In response to an instruction from the user to complete the publication of the Brabbleback, the system, a step 308, the system publishes the Brabbleback as a child of the Brabble to which it responds. Since the Brabbleback is a child of the Brabble to which it responds, publishing options like that discussed above with respect to the original Brabble are not available for selection, the publishing selection automatically being like that of the original Brabble. According to an alternative example embodiment, the user is provided with further publishing options, to further limit the scope of users who are able to view the Brabbleback to a set narrower than the set of users who are able to view the source Brabble, but, according to an example embodiment, the Brabbleback cannot be made available for viewing by users to whom the source Brabble has not been made accessible.

Figure 4:
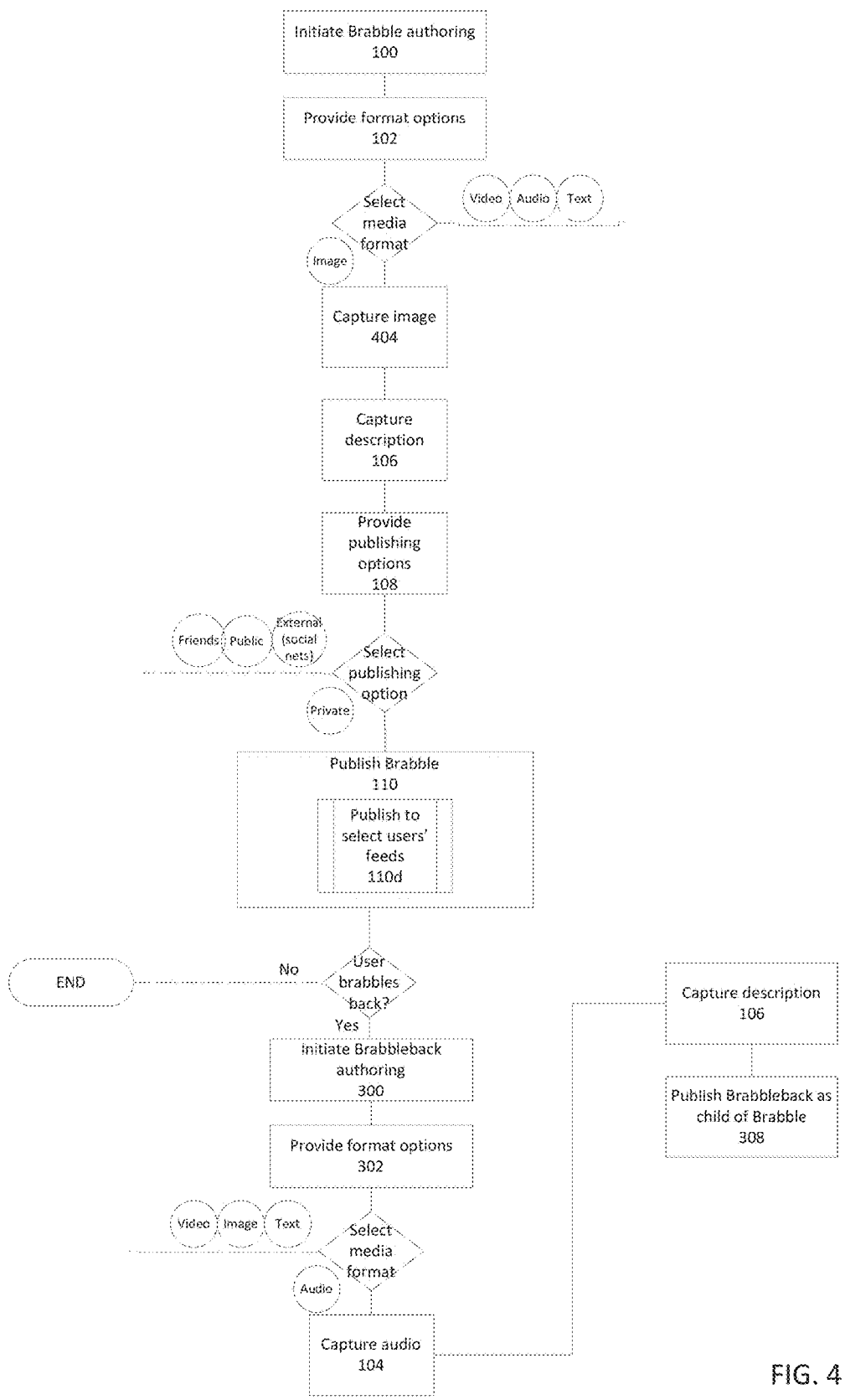
FIG. 4 is a flowchart that illustrates an example procedure for a non-brand user to author a Brabble and for another user to brabble back to the Brabble, according to an example embodiment of the present invention.

FIG. 4 is a flowchart that shows steps of a method of using a system according to an example embodiment of the present invention, including the authoring and publishing of a source Brabble of a first non-brand-type user and the authoring and publishing of a Brabbleback to the source Brabble. At step 100, the system receives user-input for initiating Brabble authoring. At step 102, the system provides the authoring environment, including selectable Brabble format options. The format options are, for example, as described above. Although any of the format options are selectable, FIG. 4 shows an instance where the user has selected image as the format option. Accordingly, at step 404, the system activates an available system camera (and/or user interface controls for control of the camera) for capture of the image. At step 106, the system receives user input of a description which the system associates with the captured image. In this illustrated example, the user does not include any star tag in the description. According to an example embodiment, the option to include a star tag in the description is not available to users within the class (non-brand) not authorized to create and insert star tags into the source Brabbles they create, except for star tags created by brand users and saved by the non-brand user for inclusion in their Brabbles created to share, promote, or recommend the brand user's content to other users within the system.

The system thereafter proceeds to step 108, as described above, for providing various publishing options, some of which are described above. FIG. 4 illustrates an instance where the user selects to publish the Brabble as "Private." At step 110, the system publishes the Brabble according to the selected publishing option. In FIG. 4, since the user has selected to publish as "Private," the publishing includes step 110d, in which the system publishes the Brabble to the feeds of other particular users selected individually and/or according to defined group(s) by the publishing user. This option is similar to the "Friends" option, except that it is more specific in that particular ones of the publishing user's "friends" and/or particular other users or user groups are selectable. It is noted that "Friends" can be selected as one of the groups for the "Private" publishing option.

A second user to whom the Brabble is made accessible has the option to brabble back. If the second user selects this option, the system, at step 300, receives user input of an instruction to begin authoring of a Brabbleback, and, accordingly, at step 302, the system provides the user with selectable media type options. It is noted that steps 300 and 302 can be a single step. For example, according to an example embodiment, the system provides Brabbleback authoring controls, which can include media type selectable options, within a posted Brabble. The selectable media types for the Brabbleback are like those of the source Brabble to which the Brabbleback responds. FIG. 4 illustrates an instance where the user selects audio as the media type, and, accordingly, the system performs steps 104 and 106 described above for creating the audio Brabble. However, the description in this illustrated case does not include a star tag. At step 308, the system publishes the Brabbleback. No publishing options are provided because the publishing options depend on the publishing options of the source Brabble of which the Brabbleback is a child. According to an alternative example embodiment, the user is provided with further publishing options, to further limit the scope of users who are able to view the Brabbleback to a set narrower than the set of users who are able to view the source Brabble, but, according to an example embodiment, the Brabbleback cannot be made available for viewing by users to whom the source Brabble has not been made accessible.

According to an alternative example embodiment, where the original source Brabble is published with a "Public" publishing option, by which the Brabble is published without restriction, another user is able to Brabbleback with an even more expansive publishing option. For example, the second user can brabble back by selecting to publish the Brabbleback, and therefore the source Brabble as well, to the social network connections of the second user in external network systems, such as via FACEBOOK, TWITTER, e-mail, SMS, etc.

Figure 5:
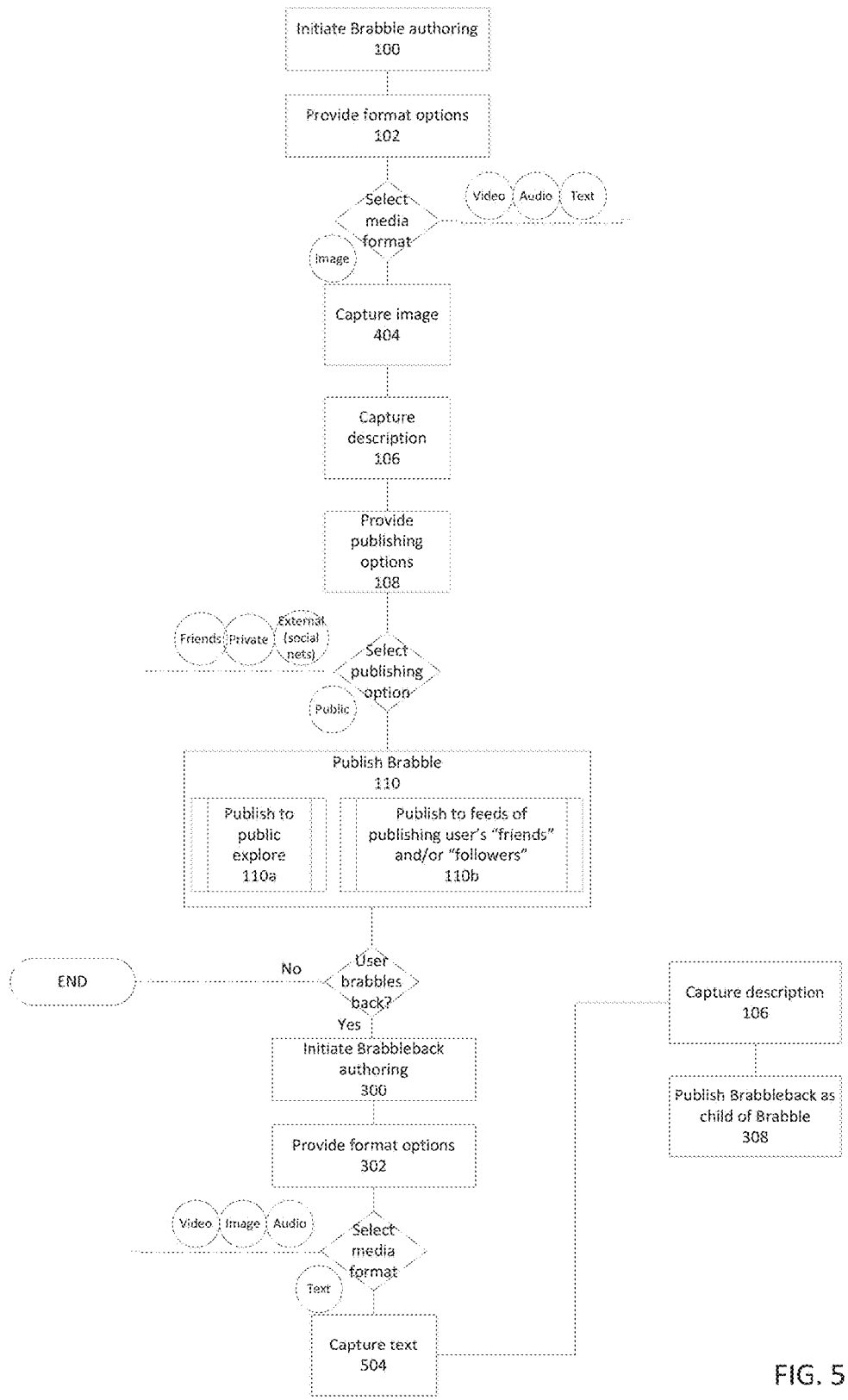
FIG. 5 is a flowchart that illustrates an example procedure for a class B user (also referred to herein as a non-brand user) to author a Brabble and for another user to brabble back to the Brabble, with different options selected than those shown in FIG. 4, according to an example embodiment of the present invention.

FIG. 5 is a flowchart that illustrates another example sequence performable by the system according to an example embodiment, in which a first non-brand-type user publishes a source Brabble and a second non-brand-type user publishes a Brabbleback. Steps 100, 102, 404, 106, and 108 are performed as described with respect to FIG. 4. The first user selects "Public" as the publishing option for the source Brabble. The system accordingly performs step 110a, to publish the Brabble to the public explore as described above, and step 110*b* to publish the Brabble to the feeds of the first user's "friends" and/or "followers as well."

A second user who is not a friend or follower of the first user can view the Brabble in the public explore or in the feed of the first user. According to an example embodiment, the Brabble is posted with a control for requesting to become a "friend" or "follower" of the first user. Such a request is presented to the first user who can decide whether to accept the request. If the request is accepted, those Brabbles published by the first user and made available for access by the first user's friends are inserted into the personal—that is non-public—feeds of the second user, and, when the second user has been accepted as a friend of the first user, the Brabbles published by the second user likewise are inserted into the feeds of the first user. This mutual visibility of one user friend to another is enabled by synchronous nature of friends within the system. According to an example embodiment, once a first and second user have "followed" each other, this synchronous relationship of "Friends" is automatically set by the system. Thus, according to this example embodiment, instead of users "friending" each other, users can choose to follow other users, and when two users follow each other, the two users are automatically treated as having a "Friend" relationship. Alternatively, the system does not recognize a "Friend" relationship, but rather provides an asynchronous relationship where a first user follows a second user without the second user following the first user, and a synchronous relationship where the first and second users both follow each other.

As described with respect to FIG. 4, a user can author and publish a Brabbleback responding to the source Brabble. If a user chooses to brabble back, the system performs steps 300 and 302, described above. FIG. 5 shows that the second user has selected to author a text Brabbleback. Accordingly, at step 504, the system records user-input text, captures a description at step 106 (at the option of the second user), and, at step 308, publishes the Brabbleback as a child of the source Brabble. As mentioned above, the publishing option follows that of the source Brabble.

Figure 6:
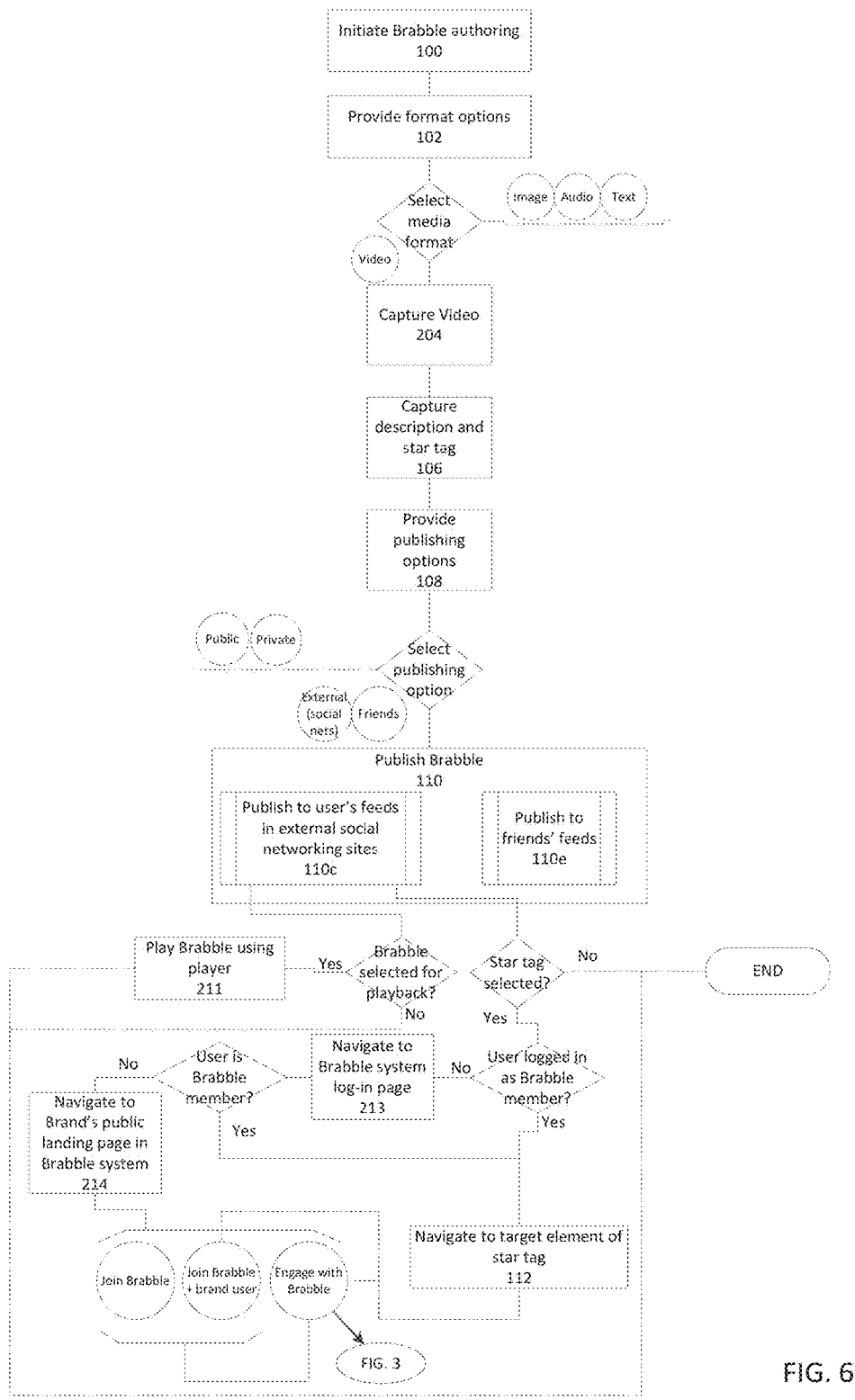
FIG. 6 is a flowchart that illustrates an example procedure for a non-brand user to author a Brabble including a brand's star tag, and for another user to interact with the Brabble, according to an example embodiment of the present invention.
Figure 8:
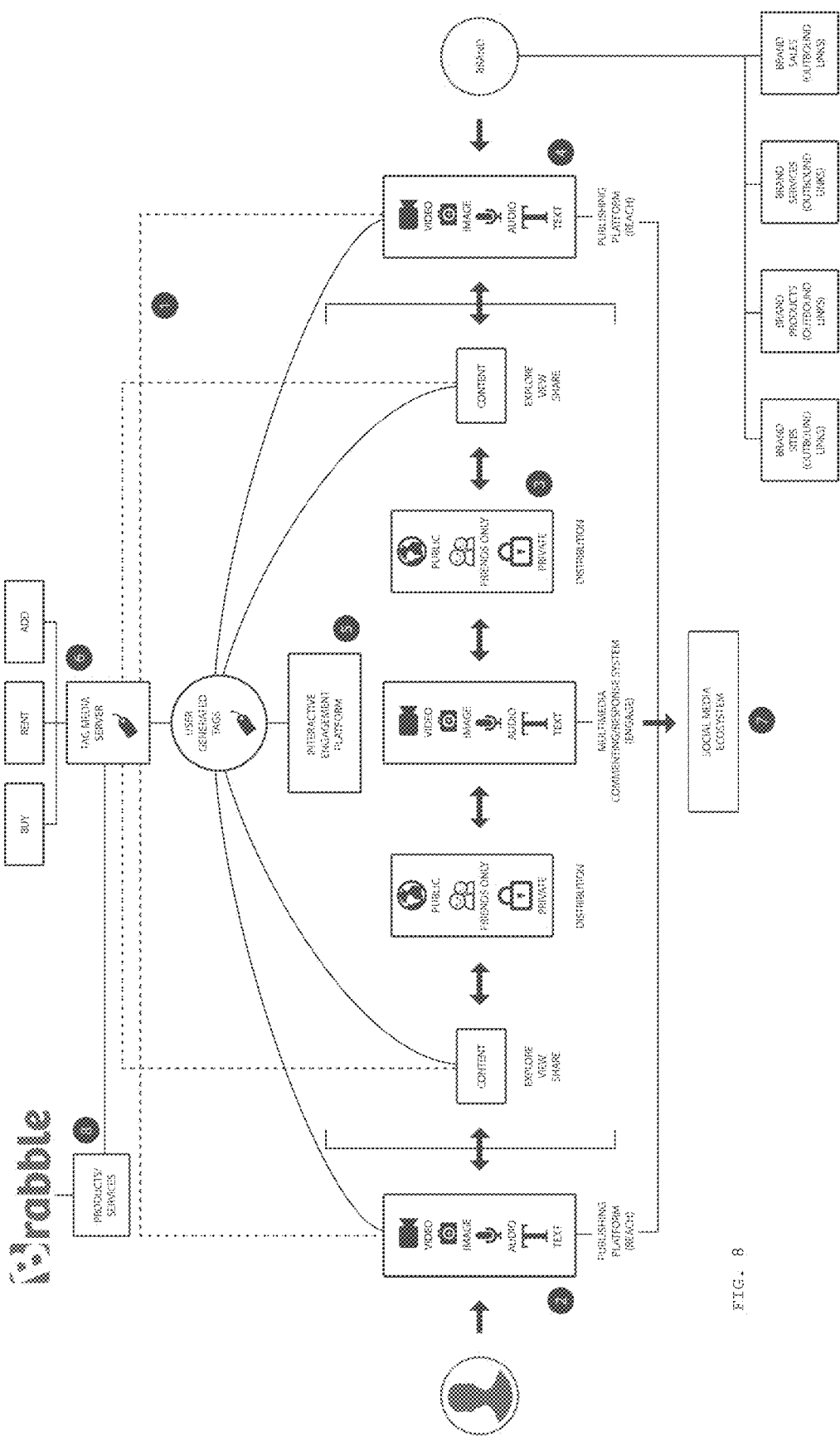
FIG. 8 is a conceptual component diagram of a method encapsulated in an expert system model for providing social interactive engagement between human users, user communities/groups, and/or brands (including, e.g., publishers, product owners, etc.) based on mobile or fixed web access methods, linked by specific personal media content and activities, managed in a combined activity and content manner that creates an intelligent and targetable platform for tailored reach and range of presence and connection between human users, brands, etc., according to an example embodiment of the present invention.

FIG. 6 shows another example of a non-brand-type user authoring and publishing a Brabble. However, at step 106, for the description entered by the user and captured by the system, the Brabble authoring user enters a star tag of a brand user. FIG. 6 shows that the user has selected to publish the Brabble to "Friends/Followers," and therefore at step 110*e*, the system publishes the Brabble to the feeds of the publishing user's system "friends" and "followers." FIG. 6 shows that the user has also selected to publish the external social networks, and therefore the system, at step 110*c*, publishes the Brabble to the external social network as described above with respect to FIG. 2. The Brabble can be selected for playback at step 211 within the external social network, as described above with respect to FIG. 2.

Although not shown in FIG. 6, according to an example embodiment, a second user can author a Brabbleback to the Brabble. For example, the Brabble, when published to the external social network, is, according to an example embodiment, provided with a control, which, when selected, causes navigation to the Brabble system and the opening of the environment described with respect to steps 300 and 302.

Additionally, as shown in FIG. 6, because the authoring user had included a brand's star tag in the description of the source Brabble, the star tag is selectable for performance of steps like those described above with respect to selection of the star tag in FIG. 2.

Figure 7:
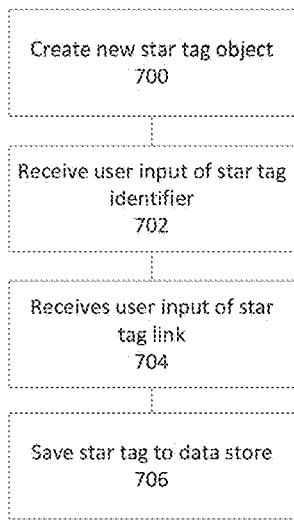
FIG. 7 is a flowchart that illustrates an example procedure for generating a star tag, according to an example embodiment of the present invention.

FIG. 7 illustrates a method for a brand user to create a star tag usable for inclusion in Brabble descriptions, according to an example embodiment of the present invention. The system receives user input of an instruction to create a new star tag. For example, in an example embodiment, the system provides a graphical user interface with a selectable control, the selection of which is interpreted as such an instruction. At step 700, the system responsively instantiates a star tag object structure to create a new star tag object. At step 702, the system receives user input of a star tag identifier, e.g., a unique character string. For example, according to an example embodiment, the string is required to include a set of contiguous alphanumeric and/or special characters preceded by a designated special character, e.g., an asterisk (*). According to an example embodiment, the user is not required to enter the asterisk when authoring the star tag; rather, the asterisk is later required to prepended to the star tag's identifier when appending the star tag to a Brabble. At step 704, the system receives user input of a content element, e.g., a Brabble, or page to which to link the new star tag, and records the link. For example, the system outputs a listing of Brabbles authored by the user or system pages of the user, which are selectable by the user as the item to which the star tag is to link. As noted above, selection of a star tag can be responded to in different ways depending on a context in which it is selected. For example, such contexts can include whether selected from within the Brabble system app or from an external social networking site. Accordingly, according to an example embodiment, the user can program the different respective target content elements or pages to which to link for the different contexts. At step 706, the system saves the new star tag to a data store of star tags, which are later usable by the creating user, and/or, according to an example embodiment, other users, in Brabble descriptions.

According to an example embodiment, the user who authors the star tag can set its properties to share the star tag for use by other users in source Brabbles created by the other user, to share the star tag for use by other users only in Brabblebacks to source Brabbles authored by the user who has created the star tag, to share the star tag for use by other users only in Brabblebacks to source Brabbles that both are authored by the user who has created the star tag and include the star tag, or not to allow any other user to insert the star tag in any Brabble or Brabbleback authored by the other user. According to an example embodiment, the system allows the authoring user to establish guidelines by way of programmable instructions associated with the star tag regarding contextual use by other users, which can impact the ability of the other users to reuse the star tag created by the authoring user.

According to an example embodiment of the present invention, the Brabble system hosts pages of brand-type users and non-brand-type users. Brand-type users are provided certain first tier member features not provided to other members, but the first tier features are provided for a price. For example, according to an example embodiment, the Brabble system tracks clicks of the brand's Brabbles and/or star tags of the brand, and could potentially enter into a commercial agreement whereby the system provider charges the brand a fee per click. According to an example embodiment, the Brabble system tracks user e-commerce behavior following a click of a Brabble or a star tag, and charges the brand a percentage or predetermined amount based on the resulting e-commerce behavior. For example, if a user selects a Brabble or a star tag, and then navigates from the page including that Brabble or the content element or page to which the star tag links to a page of the brand in which the user engages in the e-commerce transaction, then the Brabble system charges the percentage or fee. According to an example embodiment, these charges and their various pricing formulas will also be applied to clicks and traffic generated from users engaging with a brand user's star tags within Brabbles published and distributed by the brand users, other non-brand users, and/or partner users within external systems such as social networks and other digital publishers and web-sites.

According to an example embodiment, if a user creates a Brabbleback, the Brabbleback appears in the user's profile page, which is viewable by other users. Thus, when a user brabbles back to a source Brabble, the source Brabble and its Brabbleback, including the Brabbleback authored by this user, appear in the user's feed for viewing by other users. This helps increase exposure of the source Brabble, its star tag links (if any), and the user (which may be a brand) who authored the source Brabble. However, which users are able to view the source Brabble in the profile page of the Brabbleback authoring user depends on the privacy publishing settings set for the source Brabble.

According to an alternative example embodiment, only original source Brabbles authored by a user are displayed in the profile page of the user for viewing by other users, and Brabblebacks of the user, which respond to source Brabbles not authored by the user, are viewable in the user's own page of feeds presented to that user alone (and/or in pages of other users in which the source Brabble is otherwise displayed), without being displayed in the user's profile page. The Brabbleback is also viewable by all users accessing the profile page of the author of the source Brabble. In this regard, a user is provided a custom personal feeds page presented to the user alone (not accessible to other users) including feeds authored by other users which the user follows or friends, and is also provided a profile page associated with that user but which other users can access and view.

According to an example embodiment, the publishing of Brabblebacks can be handled in the same way as or in a different way than source Brabbles. While, according to an example embodiment source Brabbles appear in (a) the profile page of the authoring user, which profile page is viewable by the friends and followers of the authoring user and (b) the personal feeds page of the authoring user's friends and followers, Brabblebacks may operate differently in that, for example, they appear in the profile page of the user who authored the Brabbleback, but not in the personal feeds page of the friends and/or followers of the user who authored the Brabbleback, unless, for example, they are also friends and/or followers of the author of the original source Brabble.

Indeed, according to an example embodiment, all source Brabbles created by a user are published to the profile page of the user and to the personal feeds pages of the authoring user's friends and/or followers; and Brabblebacks created by a user are published to the profile page of the user who authored the Brabbleback, but not to the personal feeds pages of the authoring user's friends and/or followers, unless such friends or followers are also friends or followers of the author of the source Brabble.

According to an example embodiment, if a user brabbles back to a source Brabble, regardless of the relationship of the author of the Brabbleback to the author of the source Brabble, the source Brabble and its Brabblebacks are added to the profile page of the authoring user of the Brabbleback, but whether another user who has access to the postings of the profile page of the Brabbleback author is able to view the Brabbleback, according to an example embodiment, is made dependent on whether that other user has permission to view the original source Brabble.

According to an example embodiment, the locations at which a Brabbleback publishes depends on the publication settings of the source Brabble to which the Brabbleback responds, as follows. The Brabbleback is displayed in the Public Explore page if the source Brabble was shared as "Public." The Brabbleback is displayed in the personal feeds of friends/followers of the author of the source Brabble if the original source Brabble is published to the Friends/Followers (although, as mentioned above, according one example embodiment, the Brabbleback author has the ability to further limit which other users are able to view the Brabbleback, e.g., to only a subset of those who are able to view the original source Brabble). The Brabbleback will also be published on the profile page of the author of the source Brabble, and therefore viewable by all those who have access to the profile page of the author of the source Brabble (although, as mentioned above, according one example embodiment, the Brabbleback author has the ability to further limit which other users are able to view the Brabbleback, e.g., to only a subset of those who are able to view the original source Brabble).

According to an example embodiment, a first user's profile page includes a "My Brabbles" tab, selectable by other users for viewing Brabbles authored by the first user. The first user's profile page further includes a "My Brabblebacks" tab, selectable by other users for viewing Brabblebacks authored by the first user. According to an example embodiment, for any particular Brabbleback of the "My Brabblebacks" tab, only those other users who have access to the original source Brabble with which the Brabbleback is associated will be able to view the particular Brabbleback in the first user's profile page.

According to an alternative example embodiment, a Brabbleback will be viewable to all users who have access to the "My Brabblebacks" tab of the first user, but whether the original source Brabble is also fully displayed to any of those other users depends on the publishing settings of the original source Brabble, so that if a user has permission to view the original source Brabble, then that user will be able to view the original source Brabble with the Brabbleback, but if a user does not have permission to view the original source Brabble, then the user will be able to only view the Brabbleback with a notation indicating that there is an original source Brabble to which the Brabbleback is responding, without actually displaying the original source Brabble to that user. Further, according to an example embodiment, the Brabbleback appears in the "My Brabbles" tab of the profile page of the author of the original source Brabble.

A first example use case scenario applies a method of interactive social engagement through an intelligent and targetable platform where consumers and brands, such as musicians and music industry communities, create new forms of connectivity, interests and brand presence driven by a selective embedding of unique tag media placements and links, which constitute an innovative type of specific personal media content and managed through an expert interactive social engagement platform.

For example, according to an example embodiment, a system includes an interactive social engagement platform for consumer, brand, and community social interaction.

Example embodiments of the present invention provide a platform that facilitates truly interactive fan-to-fan, fan-to-artist, and artist-to-fan social multi-media, which can re-intermediate artists and their products into increasingly rich fan-to-fan environments. For example, example embodiments of the present invention provide a multi-media (e.g., video, images, audio, and/or text) social application and communications network that supports re-intermediation of fans with artists in highly monetizable organic environments realized by inserting, distributing, organizing, and optimizing the unique embedded tag media placements and links.

For example, according to an example embodiment, the platform facilitates music fans to discover, share, and connect with recording artists and each by the insertion of sampled music content and other audio artifacts into the multi-media capture and share features of the platform. Music fans, unsigned bands, recording artists, labels, DJs, club-owners/promoters can make use of the system for connecting with each other in new types of monetizable engagements facilitating measurable e-commerce and other media-based transactions between and among the varied parties to this engagement.

According to an example embodiment, the presence of recording artists on a socially interactive platform and network is established. The platform enables artist creation, optimization and distribution of human-reality-based social multi-media content elements, referred to herein as "Brabbles." Artists have the choice of capturing, posting, and sharing social content with their fans in any of four media formats—video, audio, images or text. Their fans can respond back to that content in their choice of any of the same four media formats, in a two-way, interactive multi-media engagement exchange. As an example, an artist could capture and share a Brabble which is an audio content element, e.g., the singer sings a short teaser of the singer's upcoming song, and then invites fans to Brabble back by either singing a new verse of their own (audio Brabbleback), videoing them singing their verse (video), submit their new verse in writing (text), or take and submit a picture of their musical score of their verse (image).

The platform provides for engineering targeted distribution and engagement of artists' socialized content with fans, within and outside of the social media network. According to an example embodiment, at the point of sharing or publishing each discrete social content element, the respective authoring user has the flexibility to decide whether to send/share it with any one of a plurality of user groups, for example, including a. the entire community of users (which could include external users to the system when the Brabble is also shared outbound to external social networks, e.g., Facebook, Twitter, etc., b. a finite set of existing 'Friends and Followers' connections of the user, and c. a selective subset of one or more users picked from the available list of contacts from the users' set of Friends.

Social network user signup and participation can be driven based upon a unique opportunity to "get closer than ever" to potential users' favorite recording artists. As an example, the system supports the functionality to allow an artist to capture and share a social element in any of the four available media formats with a "private" or selected subset of their fans/Friends and allow those Friends to share back to the artist and that private group of friends using any of the four available media formats.

The deeply connected nature of multi-media social interactions between fans and artists can be leveraged to provide artists and/or labels with monetizable opportunities, e.g., social engagement leading to incremental e-commerce transactions inside the network, including ticket sales, premium content, product extension line sales, etc. To support this unique type of e-commerce, the system, according to example embodiments of the present invention, introduces an innovative star tag media, a character-based link with unique qualities and characteristics allowing it to be a. embedded within the social element's content itself, b. behave with any number of interactive characteristics, e.g., serve as a grouping mechanism, serve as a link selectable to search for other social elements containing that same tag media string, serve as a link to other pages and content within the system, serve as a link to any desired external page or platform including transactional pages such as music downloads, concert ticket sales or merchandise purchase.

According to an example embodiment, these star tags serve as programmable links and are unique (exclusive to the media buyer, owner, renter) and managed as monetizable media inventory within the system's media server and platform. Additionally, social content elements (Brabbles) created within the system and containing these tag media strings, i.e., star tags, can be distributed externally when the content is shared by users outside the system, thus extending the monetizable reach of the unique media exponentially beyond the internal system.

The platform facilitates the capture and sharing of user intelligence (behavioral, linguistic, transactional, attitudinal information) through, from and into all key touchpoints of key actors, content optimization and distribution within network and across an external digital/social web, collection and leveraging of fan intelligence for labels, artists, sponsoring brands, venues and promoters, and/or retargeting of fans for sponsor brands via enhanced behavioral profiling. For example, the system tracks user interactions with various parts of the system to better customize the content. This intelligence capture, extraction, analysis and application is greatly enhanced by the nature of the multimedia content inherent to the user-generated and shared social content elements.

As an example, correlating the types of text-based content with a user's audio-based and video-based content in addition to their tag media click and traffic behavior with their eventual e-commerce transactional behavior creates a unique 360 profile view of the user which can be leveraged for future targeting of brand partner and advertiser messaging. Further, these profiled characteristics can be applied when determining algorithmic formulas for serving one content element (within the public explore section of the system's application) to one user and a different content element to another user, based not only on analysis of their transactional, behavioral and linguistic history, but their demonstrated proclivity for preferring to share and consume certain types of messages and content via one multi-media format over another. As an example, over a period of time the system can determine that a particular user enjoys interacting with recording artists through mostly the audio sharing and response medium, but they have a higher preference for interacting with fashion brands and advertisers through image-based medium. For example, the user is recorded as having selected only or mostly audio elements of a first kind of brand, and only or mostly images of a second kind of brand. These demonstrated user-behavioral characteristics can be automatically/algorithmically applied in determining which social content elements to serve and deliver to one user over another, thus increasing the likelihood of monetizable engagement with brand partners and their embedded tag media.

A second example use case scenario applies a method of interactive social engagement through an intelligent and targetable platform where sports leagues communities of players, fans, and affiliates are able to come together to create new forms of social interactions, communicate, collaborate, and conduct commerce, managed through an expert interactive social engagement platform, according to an example embodiment of the present invention.

According to an example embodiment, a system includes an interactive social engagement platform for brand, community, and fan social interaction.

According to an example embodiment, the platform enables leveraging the full life cycle of players from the earliest stage of their journeys and through their careers, importantly extending before and beyond the playing seasons. As disparate stakeholders vie for fan wallet-share, the platform of the present invention can serve as a social media and social commerce glue uniting leagues, teams, players, press, sponsors and fans.

The platform provides the ability to (a) connect and organically monetize diverse, disparate groups around user-generated content based upon the core product, i.e., the players, (b) re-intermediate the often dysfunctional and cross-purpose activities, products, and services between leagues, teams, and players, (c) leverage everyday moments as product extensions to the core product, especially before and after regular season play, (d) break down the "entertainment" wall between players/teams and their fans with human-generated two-way multi-media, (e) re-balance the power of the media and the press' ability to control the team/player brand story, and (f) create a unique sponsorship role for brands with more organic placement within league/team/player social media. The platform is more engaging and actionable than traditional advertising placement and media.

The platform provides for social multi-media content creation, optimization, distribution, and monetization; embedding of game content within a social environment; performance engagement media; embedding of social star tag media (e.g., pay-per-click, cost-per-action, revenue share); media extension opportunities outside of social network; consolidation of player social media content within single fan-based network; and retargeting of fans for artists and other sponsor brands via enhanced behavioral profiling of social network member users.

The platform provides a dynamic multimedia sharing, interactions, and communications environment by which sports leagues, teams, players, influencers, and fans can come together. Users of the platform can include, for example, a sports league, e.g., NFL, NHL, MLB, NBA, EPL, Champions, NASCAR, Fla.; sponsors; teams; owners; players; sports press and influencers; broadcast and digital media; and fans.

According to an example embodiment, the credible presence and role is established for league sanctioned and endorsed real-time, multi-social media across the arc of the season, and beyond. Programs can be structured around key events, e.g., draft day, bootcamps, preseason, playoffs, key rivalries, awards presentations, etc. Key actors, e.g., players, agents, team managers, league officials, press/media and fans, can be recruited, enabled, and promoted during key events. Multi-social media content (Brabbles) of key actors can be optimized and distributed into target-rich fan environments online, e.g., existing social networks, league/team digital properties, fan blogs and forums. Selected press/media can be recruited and activated. The platform facilitates capturing and sharing real-time multi-media content around players' lives, their families, agents and industry commentators. The platform can facilitate maximum download, installation, and sharing of a Brabble application to secure ongoing connection to fan use-case from pre-season, through the season, into post-season, and beyond around the full, human player life cycle.

A third example use case scenario applies a method of interactive social engagement through an intelligent and targetable platform where brands can create prescriptive dynamic and personalized relationships with human users in a proactive social and content/interest driven manner, managed through an expert interactive social engagement platform, according to an example embodiment of the present invention.

According to an example embodiment, a system includes an interactive social engagement platform for interactive brand management. In this regard, consumers are spending the majority of their connected digital lives (both via mobile and fixed web) in social networks and sharing social media, but current advertising products within the most popular social media networks, e.g., Facebook, Twitter, and YouTube, are not providing sufficiently scalable, efficient, and targeted advertising vehicles to meet large brands' strategic objectives for engaging, acquiring, and retaining customers via digital channels.

According to an example embodiment, the platform facilitates branding by leveraging a unique network and community for content and multi-media social sharing, for a new kind of digital measured media. For example, consumer products brands, brand representatives, and spokespeople can make use of the system.

According to an example embodiment, brands are provided with a social media product tied directly into their user-generated social media content and community. Organically embedded branded social media tags are developed which can be rented or owned by brands and serve as both impression-based as well as performance branded media. According to an example embodiment, an auction-based marketplace is provided where brands can bid on, own, and rent social tag media, e.g., the described star tags, embedded within both brand and consumer generated social media content. According to an example embodiment, a social network member-based loyalty program is developed, creating unique stickiness and participation, with points accrual based upon increasing social currency via content creation, user popularity, repeat visits and usage, and member-get-member activities. According to an example embodiment, the platform offers brand sponsorship opportunities and matches brands' product sets to targeted segments of network users, allowing brands to fund monthly redemption of social network loyalty points for real-world value, e.g., brand products/services, retail credits, cash, etc., also referred to herein as Brabble Points.

The platform provides for (a) the embedding of branded social media star tags in both brand and user-generated content; (b) performance based tag media; (c) performance based brand pages, brabbles or other interactive content with outbound links to monetization vehicles (PPC, CPA, and revenue share model between brand and social network); (c) a social media network member loyalty program with points accrual and brand sponsored redemption; (d) social media network member profiles based upon behavioral and transactional data-points, supporting targeted matching of member segments to most appropriate brand pairings; and/or (e) retargeting of members for sponsoring brands via enhanced behavioral profiling, both in network and outside of network.

A fourth example use case scenario applies a method of interactive social engagement through which human users and brands can make specific and discrete distribution decisions for all social media content shared via publishing system supporting variable distribution options, including, for example, a) one or more privately selected contacts, b) all of a user's defined "friends and followers" within the application and c) globally shared to all users as public content within the application as well as outside of the application for socially shared and distributed content, according to an example embodiment of the present invention.

According to an example embodiment, a system includes an interactive social engagement platform for selective sharing of personal media. According to an example embodiment of the present invention, the platform provides a more targeted and selective set of sharing and publishing options than those provided by conventional systems, which sharing and publishing options would allow users to make individual and specific distribution decisions based upon the nature of the personal social media content being shared. The platform supports a range of distribution options at the individual discrete point of content sharing and publishing, so that users and brands can make specific and discrete decisions about their sharing and distribution paths for their individually captured or created social media content. The system can be used by, for example, human users, brand users, community and group users, administrative users, etc.

According to an example embodiment, once a user has either created or captured a discrete personal media content, e.g., video, photo, image, text or audio clip, the user is presented with a unique range of sharing and publishing options for determining the targeted distribution of the content element. For example, according to an example embodiment, the options include (1) sharing privately only to a dynamically selected list of one or more users selected from the users' contact list, (2) sharing privately or publicly only to those users who have been designated as "Friends" or "Followers" of the user, and (3) sharing publicly to all registered users within the application and to external public users when the social media content is distributed outside of the native network via social sharing.

According to an example embodiment, the platform includes a social media content publishing and distribution feature set providing users with uniquely tailored sharing pathways for each piece of captured or created personal social media content elements. The platform provides a functional feature set that supports selective sharing to (1) friends (2) selected contacts, or (3) global users. When personal social media content is shared with any private or semi-private distribution parameters, e.g., with "Friends," "Followers," or selected "Contacts," that content can only be viewed and interacted with by the users with whom it was initially shared by the content creator or publisher.

Non-exhaustive Listing of Example Features

According to an example embodiment, a feature set includes a computer-implemented method, including: providing a platform for interactive engagement customized for use by at least one of particular users, particular brands, and particular communities with one or more specific content elements, which content elements pertain to at least one social media interaction, the at least one social media interaction including at least one of content capture, content creation, content publishing, content sharing, and responding interactively using at least one of access and distribution methods of at least one of connected mobile and connected fixed web devices for commerce and collaboration experiences managed: a) as unique and exclusive tag media strings, i.e., star tags, embedded within the socially shared content elements in any of the four available media formats (video, audio, images or text) and via any of the available selective sharing distribution methods, e.g., globally within the system and selectively external to the system, to a user's Friends/Followers only, or to a subset of one or more of the users friends selectively; b) as above, these unique tag media strings are capable of supporting a range of behaviors, allowing the system to group and organize content elements by tag strings, generate search results and sub-feed of content elements by tag string and support a range of interactive and transactional outcomes and experiences when treated as programmable links within the system, e.g., behaving in defined ways dependent on the contextual environment from within which the star tag media link is activated; c) by creating a linkage and integration within the native social system and across generally available social media sites when the content elements are shared externally; linkage by way of the managed tag media string's grouping, sorting and linking characteristics; integration by way of embedding the same tag media strings into social content elements generated from within the system as well as directly into external branded content and social media elements generated and distributed external to the system; d) as media inventory whereby the tagged media strings are purchased, owned or rented by brand users, advertisers or other partners and these tag strings, embedded within the social content elements allowing the media owners to specify, tailor and target an engineerable branded presence and direct connections with users, content and communities whereby brands may invoke via the unique tagged media such presence connection on a temporary basis based upon events or offers with expiration; in a time based manner based upon traditional media-serving day-part strategies; and/or in a topic or sentiment based method based upon linguistic and/or semantic analysis and knowledge application, which can be acquired on a rental basis, outright purchase basis, auction/award basis or cost per click, (traffic generating to media purchase/owner content, sites, etc.) cost per action or shared revenue basis (revenue-sharing with the media purchaser/owner); e) crowd-sourced amplification of the embedded star tag media when it is appropriated for use by system users other than the media owners and included as embedded tag media strings within their own socially captured and shared content elements thus extending the monetizable reach and distribution of these monetizable tag media strings as links across the system as well as into external social and web-based networks, publishers and channels; f) usage and adoption of branded star tag media strings by non-brand users indicating preference and adherence of the user for particular brands, products, content, sentiments, etc. to support unique targeting of future messaging and targeted offers based upon the nature and use of the particular adopted tag media strings embedded within the socially shared content elements; g) via connections and interactions which can be managed in a loyalty/reward manner tied to specific content, topics, interaction activity or specific commerce behavior and subsidized by brand partner redemption, where brands may choose to sponsor relevant and popular tag media strings allowing system users to incorporate those targeted and desirable tag media strings into their own social content elements and earning points towards a loyalty program with available brand sponsored options for redemption of future value, e.g., cash, products or services; h) whereby loyalty program points can also be accrued by system users for positive and desirable behaviors endemic to the system, e.g., most popular social content elements, most shared social elements, most responded to social elements, most branded tag media string adoption, and these behaviorally accrued points can be redeemed by way of sponsorships supported by brands and other advertisers based upon a targeted matching of system user to brand advertiser; and i) whereby all platform interaction may originate or participate through or be embedded into workflow generated by, within or across third-party portal-based destinations on the mobile and fixed web extending traditional portal content and activity with similar uniquely tagged content elements, classifications, native social media integrations, tagged media placement and interactions, loyalty programs integrations and along with cost per click, cost per action and revenue sharing advertising channel methods. For example, a plurality of entities may host respective closed networks that each implements the described features concerning postings, reply postings, and inventories and use of star tags, where the star tags of the respective networks are functional only within the respective closed networks and/or function according to rules governed by the respective closed networks. Further, according to an example embodiment, the individual closed networks are linked to an umbrella network that is configured to publish star tag links universally or selectively to the individual closed networks. Moreover, the individual closed networks may be required to pay a licensing fee to an owner of the umbrella network, and usage of the individual closed networks may be tracked for automatic calculation of amounts owed by the individual closed networks to the umbrella network.

In an example embodiment implementing the feature set, the method further includes a sub-feature of providing the social media content publishing platform to the particular user via a user interface on a mobile or fixed web or smart phone device for personal social media content capturing/generation, publishing and dynamic interaction.

In an example embodiment including the sub-feature, the method further includes creating content via any smart phone (or other enabled device, including, for example, tablets and personal computers) publishing methods across a choice and mix of personal media including video, photo/image, audio, text or tag for distributing and enabling custom user interactions socially.

In an example embodiment including the sub-feature, creating content via any smart phone (or other enabled device, including, for example, tablets and personal computers) publishing methods across a choice and mix of personal media can be selectively shared with predefined or dynamically selected user(s) on a continuum from a) one or more privately selected contacts, b) all of users defined "friends" or "followers" within the application to c) globally shared to all users as public content within the application as well as outside of the application for socially shared and distributed content.

In an example embodiment implementing the feature set, the method further includes providing the social media content publishing platform to the particular brand via a user interface of human media on a mobile or fixed web or smart phone device (or other enabled device, including, for example, tablets and personal computers); a method for publishing tailored brand presence via uniquely tagged and generated social media content enabling rich human user connection and engagement with a user's daily activities based on specific user or community content around shared interest; brands manage granular, interactive and real time branding and commerce via any method of access, any place, any time.

In an example embodiment implementing the feature set, human and brand users come together in unique moments of engagement via the shared social media content through the business platform's interface on a mobile or fixed web or smart phone device. The nature and degree of this engagement and real time branding and commerce via any method of access, any place, any time; a method for enabling uniquely deep and interactive engagement between users both human and brand via the technology of a two-way multi-media response utility supporting response to user generated multi-media content via the same choices of social media response content, specifically video, photo/image, audio, text or tag enabling custom user interactions socially.

In an example embodiment implementing the feature set, brand users create multi-media social content containing embedded tag media, referred to as star tags, which function as branded links to brand user pages or content both within the platform and external to the platform, e.g., e-commerce websites; the method where a unique managed media platform environment makes available specific star tag media character strings for brands and other advertisers to bid on owning or renting and the corresponding method by which the star tag media is purchased, distributed, tracked, optimized and charged for within an embedded media server environment native to the platform.

In an example embodiment implementing the feature set, third party external social networks and social media publishers access and embed the user and brand generated multi-media content outside of the service integration and system intermediation within web-based (fixed and mobile web) social media and social networking destination communities and publishing sites. Specific services made available into and across third party social networks and social media publishers include: a) replicate the full functionality and feature set of the native network system (also referred to as the Brabble system) within the third party external social network or other social media publisher environment; b) the embedded distribution of interactive multi-media social content shared by human and brand users from within the platform accommodating both real-time as well as simulated interactive engagement; c) embedded star tag media both branded and unbranded which are tagged and tracked as distributed media impressions as well as trackable links leading back to the platform and/or other branded or e-commerce website both mobile and fixed; and d) a distributed and embedded multi-media commenting (posting and response) utility supporting creating and responding to user generated multi-media content via the same choices of social media response content, specifically video, photo/image, audio, text or tag enabling custom user interactions socially.

In an example embodiment implementing the feature set, third party external platforms and businesses access and embed the service integration and system intermediation through fixed and mobile web destination sites such as news portals, community portals or other forms creating pass through licensed monetization, interaction and dynamic impressions for users, brands and communities in a real time connected manner via interfaces including application programming interface (API). Specific service integration with publishers and portals to include embedding the platform's multi-media commenting and response application within native publishing environments through a range of service methodologies including software licensing, hosted solutions and direct API integration of the system to serve as the portal/publishers' native commenting system.

Configurations

An example embodiment of the present invention is directed to one or more processors, which can be implemented using any conventional processing circuit and device or combination thereof, e.g., a Central Processing Unit (CPU) of a Personal Computer (PC) or other workstation processor, to execute code provided, e.g., on a hardware computer-readable medium including any conventional memory device, to perform any of the methods described herein, alone or in combination, and to generate any of the user interface platforms and/or displays described herein, alone or in combination. The one or more processors can be embodied in a server or user terminal or combination thereof. The user terminal can be embodied, for example, as a desktop, laptop, hand-held device, Personal Digital Assistant (PDA), television set-top Internet appliance, mobile telephone, smart phone, tablet, phablet, etc., or as a combination of one or more thereof. For example, according to an example embodiment, the functionality is provided by way of a downloadable app to a smart phone or other enabled device, including, for example, tablets and personal computers. Additionally, some of the described methods can be performed by a processor on one device or terminal and using a first memory, while other methods can be performed by a processor on another device and using, for example, a different memory.

The memory device can include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

An example embodiment of the present invention is directed to one or more hardware computer-readable media, e.g., as described above, on which are stored instructions executable by a processor to perform the methods and/or provide the user interface features described herein.

An example embodiment of the present invention is directed to a method, e.g., of a hardware component or machine, of transmitting instructions executable by a processor to perform the methods and/or provide the user interface features described herein.

The above description is intended to be illustrative, and not restrictive. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

What is claimed is:

1. A computer-implemented method comprising:
obtaining, by a computer processor and via a network, a first media content object attributed to a first user;
outputting, by the processor and via a graphical user interface display arrangement for a second user, the obtained first media content object;
receiving, by the processor, user input by interaction with the graphical user interface display arrangement; and
based on the user input, recording and transmitting over the network, a second media content object in association with the first media content object, wherein the second media content object includes at least one of video, audio, and an image;
wherein:
the first media content object is part of a posting authored by the first user;
the second media content object is part of a reply posting authored by the second user;
the posting and the reply posting are two of a plurality of postings authored by a plurality of users of a system and posted by the plurality of users to respective user pages of the system that are associated with respective users of the system;
each of the posting and the reply posting includes a tag, wherein:
the tag is a text string defined by the first user for linking to another posting of the first user;
the tag is activatable and deactivatable by the first user such that when the first user activates the tag, the plurality of users of the system can access the other posting using the linking of the tag, and when the first user deactivates the tag, the plurality of users of the system cannot access the other posting using the linking of the tag;
the tag is further configured so that the linking of the tag changes based on the log-in status and an attribute of a profile of each of the plurality of users of the system;
the graphical user interface display arrangement is a system-wide feeds page (a) that includes an aggregation of the postings authored by the plurality of users, (b) that includes the posting and the reply posting, and (c) that is accessible to all users of the system to view the aggregated postings; and
the aggregated postings are arranged in the system-wide feeds page in chronological order of their respective postings to the respective user pages.

2. The method of claim 1, wherein:
the graphical user interface display arrangement is part of an authoring environment for authoring a post;
the second media object is part of a post structure that is generated by the processor in response to the interaction and that is associated by an authorship association with the second user;
the transmitting includes, in accordance with user selection of one of a plurality of privacy options selectable from within the graphical user interface, posting by the processor, the generated post to a page of posts of the second user and to feed pages of only a subset of a plurality of other users who have selected to follow the second user;
the subset includes only those of the plurality of other users to whom the selected privacy option grants access;
only the subset of the plurality of other users can view the post when accessing the page of posts of the second user;
the selection of the privacy option includes individually selecting each of at least one of the subset of the plurality of other users by a respective unique identifier;
each of the feed pages of the subset of the plurality of other users includes posts of users whom the respective other user follows; and
responsive to posting, by one of the subset of the plurality of other users, of a reply to the post authored by the second user, access to the reply is restricted so that the reply can be accessed by only those users to whom access is granted by both the selected privacy option of the post of the second user and a selected privacy option selected for the reply by the one of the subset of the plurality of other users.

3. The method of claim 1, further comprising:

outputting, by the processor and in a display device, a graphical user interface of an authoring environment for authoring a post;

responsive to user-interaction with a graphical element in the graphical user interface, generating, by the processor, a second post structure associated by an authorship association with a first user;

responsive to user selection of one of a plurality of privacy options selectable from within the graphical user interface, posting by the processor, the generated second post to a page of posts of the first user and to system-wide feed pages of only a subset of a plurality of third users who have selected to follow the first user, wherein:

the subset includes only those of the plurality of third users to whom the selected privacy option grants access;

only the subset of the plurality of third users can view the post when accessing the page of posts of the first user;

the selection of the privacy option includes individually selecting each of at least one of the subset of the plurality of third users by a respective unique identifier; and each of the system-wide feed pages of the subset of the plurality of third users includes posts of users whom the respective third user follows; and responsive to posting, by one of the subset of the plurality of third users, of a reply to the second post authored by the first user, restricting, by the processor, access to the reply to only those users to whom access is granted by both the selected privacy option of the second post of the first user and a selected privacy option selected for the reply by the one of the subset of the plurality of third users.

4. The method of claim 3, wherein the reply to the second post is generated in response to user input by interaction with the page of posts or one of the system-wide feed pages, which user input causes a responsive recording and transmitting over a network of a media content object in association with a media content object of the second post structure associated by the authorship association with the first user, and wherein the transmitted media content object is transmitted as part of the reply to the second post and includes at least one of video, audio, and an image.

5. The method of claim 4, wherein the generated second post includes a graphical control that is user-selectable for activating a video recorder to record a video limited to no longer than a predefined length, the method further comprising:

responsive to finalization of the recording of the video, providing the video as part of the reply to the second post, such that, in response to subsequent access of the generated second post associated by the authorship association with the first user, the generated second post associated by the authorship association with the first user is posted together with the video as a sub-entry thereto.

6. The method of claim 5, wherein the predefined length is 45 seconds.

7. The method of claim 4, wherein the generated second post includes a graphical control that is user-selectable for activating an audio recorder to record audio limited to no longer than a predefined length, the method further comprising:

responsive to finalization of the recording of the audio, providing the audio as part of the reply to the second post, such that, in response to subsequent access of the generated second post associated by the authorship association with the first user, the generated second post associated by the authorship association with the first user is posted together with the audio as a sub-entry thereto.

8. The method of claim 7, wherein the predefined length is 5 minutes.

9. The method of claim 4, wherein the generated second post associated by the authorship association with the first user includes at least one of video, audio, text, and an image.

10. The method of claim 4, wherein:

a type of the media content object transmitted as part of the reply to the second post is selectable from at least two of the following types: video, audio, text, and image; and the type selected for the media content object transmitted as part of the reply to the second post is not limited to a type of the media content object of the post structure associated by the authorship association with the first user.

11. The method of claim 4, wherein the association of the transmitted media content object with the media content object of the second post structure packages the transmitted media content object as reply to the second post structure to cause the transmitted media content object to be displayed as a sub-entry to the media content object of the second post structure upon subsequent access of the second post structure via the network.

12. The method of claim 1, wherein the system-wide feeds page is continuously updated as new postings are posted in the system.

13. The method of claim 12, wherein the update is performed in real-time.

14. The method of claim 12, wherein the update includes updating a display of the system-wide feeds page to display the new postings without requiring a refresh of the system-wide feeds page.

15. The method of claim 1, wherein the tags are selected from a store that contains a plurality of tags.

16. The method of claim 1, wherein the first user defines context-dependent rules for the tags.

17. The method of claim 16, wherein the first user can permit or deny use of the tag by at least a second user.

18. The method of claim 1, wherein the first user authors a list of tags, from which the second user can select one or more tags for insertion into the second user's post.

19. The method of claim 1, wherein the tag used by the first user selectively blocks the inclusion of a plurality of tags based on the association of the particular tag used by the first user.

20. The method of claim 1, wherein the tag causes the processor to respond differently depending on whether the plurality of media objects are viewed on a native system or application or on an external system or application.

21. The method of claim 1, wherein the method includes maintaining a set of user profiles, and for at least one of the user profiles in the set, storing a plurality of rules for the tags or links, which can be set as active or inactive by the at least one user of the user profiles in the set.

22. The method of claim 1, wherein the tag is associated with at least one financial rule.

23. The method of claim 22, wherein the satisfaction of the at least one financial rule by the second user grants the second user use of the tag.

* * * * *